United States Patent
Boca et al.

(10) Patent No.: US 7,336,814 B2
(45) Date of Patent: Feb. 26, 2008

(54) METHOD AND APPARATUS FOR MACHINE-VISION

(75) Inventors: Remus F Boca, North Vancouver (CA); Babak Habibi, North Vancouver (CA); Mohammad Sameti, Coquitlam (CA); Simona Pescaru, Vancouver (CA)

(73) Assignee: Braintech Canada, Inc., North Vancouver (CA)

( * ) Notice: Subject to any disclaimer, the term of this patent is extended or adjusted under 35 U.S.C. 154(b) by 0 days.

(21) Appl. No.: 11/183,228

(22) Filed: Jul. 14, 2005

(65) Prior Publication Data

US 2006/0088203 A1    Apr. 27, 2006

Related U.S. Application Data

(60) Provisional application No. 60/587,488, filed on Jul. 14, 2004.

(51) Int. Cl.
*G06K 9/00* (2006.01)

(52) U.S. Cl. .............. 382/141; 382/142; 382/143; 382/144; 382/147; 382/152

(58) Field of Classification Search ........ 382/141–153, 382/155–160
See application file for complete search history.

(56) References Cited

U.S. PATENT DOCUMENTS

| | | | |
|---|---|---|---|
| 3,986,007 A | 10/1976 | Ruoff, Jr. .............. | 235/151.1 |
| 4,146,924 A | 3/1979 | Birk et al. .............. | 364/513 |
| 4,219,847 A | 8/1980 | Pinkney et al. ........ | 358/126 |
| 4,305,130 A | 12/1981 | Kelley et al. ........... | 364/513 |
| 4,334,241 A | 6/1982 | Kashioka et al. ...... | 358/107 |
| 4,437,114 A | 3/1984 | LaRussa ................. | 358/101 |
| 4,578,561 A | 3/1986 | Corby, Jr. et al. ..... | 219/124.34 |
| 4,613,942 A | 9/1986 | Chen ...................... | 364/513 |

(Continued)

FOREIGN PATENT DOCUMENTS

EP    0 114 505    8/1984

(Continued)

OTHER PUBLICATIONS

"3D Robot Guidance with a Single Camera," ISRA Vision Systems AG, pp. 83-105, no date available.

(Continued)

*Primary Examiner*—Brian Le
(74) *Attorney, Agent, or Firm*—Seed IP Law Group PLLC

(57) ABSTRACT

A system and method facilitate machine-vision, for example three-dimensional pose estimation for target objects, using one or more images sensors to acquire images of the target object at one or more positions, and to identify features of the target object in the resulting images. A set of equations is set up exploiting invariant physical relationships between features such as constancy of distances, angles, and areas or volumes enclosed by or between features. The set of equations may be solved to estimate a 3D pose. The number of positions may be determined based on the number of image sensors, number of features identified, and/or number of known physical relationships between less than all features. Knowledge of physical relationships between image sensors and/or between features and image sensors may be employed. A robot path may be transformed based on the pose, to align the path with the target object.

39 Claims, 12 Drawing Sheets

U.S. PATENT DOCUMENTS

| | | | |
|---|---|---|---|
| 4,654,949 A | 4/1987 | Pryor | 29/407 |
| 4,835,450 A | 5/1989 | Suzuki | 318/568.13 |
| 4,942,539 A | 7/1990 | McGee et al. | 364/513 |
| 5,083,073 A | 1/1992 | Kato | 318/577 |
| 5,212,738 A * | 5/1993 | Chande et al. | 382/152 |
| 5,350,269 A | 9/1994 | Azuma et al. | 414/416 |
| 5,454,775 A | 10/1995 | Cullen et al. | 483/16 |
| 5,696,673 A | 12/1997 | Pryor | 364/167.01 |
| 5,956,417 A | 9/1999 | Pryor | 382/154 |
| 5,959,425 A | 9/1999 | Bieman et al. | 318/568.15 |
| 5,978,521 A * | 11/1999 | Wallack et al. | 382/294 |
| 6,044,183 A | 3/2000 | Pryor | 382/287 |
| 6,115,480 A * | 9/2000 | Washizawa | 382/103 |
| 6,141,863 A | 11/2000 | Hara et al. | 29/714 |
| 6,167,607 B1 | 1/2001 | Pryor | 29/407.04 |
| 6,211,506 B1 | 4/2001 | Pryor et al. | 250/208.1 |
| 6,301,763 B1 | 10/2001 | Pryor | 29/407.04 |
| 6,341,246 B1 | 1/2002 | Gerstenberger et al. | 700/245 |
| 6,466,843 B1 | 10/2002 | Bonanni et al. | 700/245 |
| 6,594,600 B1 | 7/2003 | Arnoul et al. | 702/94 |
| 6,628,819 B1 * | 9/2003 | Huang et al. | 382/154 |
| 6,754,560 B2 | 6/2004 | Fujita et al. | 700/245 |
| 6,804,416 B1 | 10/2004 | Bachelder et al. | 382/294 |
| 6,816,755 B2 | 11/2004 | Habibi et al. | 700/259 |
| 7,061,628 B2 * | 6/2006 | Franke et al. | 356/604 |
| 2003/0004694 A1 | 1/2003 | Aliaga et al. | 703/2 |
| 2003/0007159 A1 * | 1/2003 | Franke et al. | 356/604 |
| 2004/0114033 A1 | 6/2004 | Eian et al. | 348/42 |
| 2004/0172164 A1 | 9/2004 | Habibi et al. | |

FOREIGN PATENT DOCUMENTS

| | | |
|---|---|---|
| EP | 0151417 | 8/1985 |
| EP | 0493612 | 7/1992 |
| EP | 0763406 B1 | 9/1997 |
| EP | 0911603 B1 | 4/1999 |
| EP | 0951968 | 10/1999 |
| JP | 1-124072 | 5/1989 |

OTHER PUBLICATIONS

3D Vision with One Camera, URL=http://neu.isravision.com/likecms/index.php?site=site.html&dir=isra&nav=162, download date Apr. 12, 2005.

Bejczy, A. K., "Challenges of Human-Robot Communication in Telerobotics," IEEE International Workshop on Robot and Human Communication, pp. 1-8, Nov. 11-14, 1996.

Borotschnig, H., et al., "Appearance-Based Active Object Recognition," Image and Vision Computing, 18:715-727, 2000.

U.S. Appl. No. 60/413,180, filed Sep. 23, 2002, Eian et al.

U.S. Appl. No. 60/587,488, filed Jul. 14, 2004, Boca et al.

Denzler, J., et al., "Learning, Tracking and Recognition of 3D Objects," *Proceedings of the International Conference on Intelligent Robots and Systems (IROS)*, XP000512662, 1:89-96, Munich, Sep. 12, 1994.

Huang, T., et al., "Uniqueness of 3D Pose Under Weak Perspective: A Geometrical Proof," *IEEE Transactions on Pattern Analysis and Machine Intelligence*, 17(12):1220-1221, Dec. 1995.

Ji, Q., et al., "An Integrated Linear Technique for Pose Estimation from Different Geometric Features," International Journal of Pattern Recognition and Artificial Intelligence, 13(5):705-733, Aug. 1999.

Jia, Y-B., et al., "Sensing Polygon Poses by Inscription," in *Proceedings of 1994 IEEE International Conference on Robotics and Automation*, Los Alamitos, CA, May 8, 1994, pp. 1642-1649.

Kim, W., "Computer Vision Assisted Virtual Reality Calibration," URL=http://www-robotics.jpl.nasa.gov/publications/Won_Kim/ra98_vrc.pdf.

Kovacic, S., et al., "Planning Sequences of Views for 3-D Object Recognition and Pose Determination," Pattern Recognition, 31(10):1407-1417, 1998.

Liu, Y., et al., "Determination of Camera Location from 2D to 3D Line and Point Correspondences", *IEEE Transaction on Pattern Analysis and Machine Intelligence*, 12(1), Jan. 1990.

Lu, C-P., et al., "Fast and Globally Convergent Pose Estimation from Video Images," *Transactions on Pattern Analysis and Machine Intelligence*, 22(6):610-622, Jun. 2000.

Meyer, W.,"One-Eyed Robots With 3D Vision," ISRA Vision Systems AG, Press News, Release No. 16, Jun. 15, 2004, pp. 1-7.

Sanchez, A., et al., "Robot-Arm Pick and Place Behavior Programming System Using Visual Perception," in *Proceedings of the 15th International Conference on Pattern Recognition*, Los Alamitos, CA, Sep. 3-7, 2000, 4:507-510.

Sharma, R., "Visual Servoing with Independently Controlled Cameras Using a Learned Invariant Representation," in *Proceedings of the 37th IEEE Conference on Decision & Control*, Tampa, FL, Dec. 1998, pp. 3263-3268.

Tsai, R., et al., "A New Technique for Fully Autonomous and Efficient 3D Robotics Hand/Eye Calibration," in *IEEE Transactions on Robotics and Automation*, 5(3):345-358, Jun. 1989.

Wei, G.-Q., et al., "Active Self-Calibration of Robotic Eyes and Hand-Eye Relationships With Model Identification," *IEEE Transactions on Robotics and Automation*, 14(1):158-166, Feb. 1998.

Wei, G-Q., et al., "Multisensory Visual Servoing By a Neural Network," *IEEE Transactions on Systems, Man and Cybernetics*, Part B: CYBERNETICS, 29(2):276-280, Apr. 1999.

Zhang, Z., "A Flexible New Technique for Camera Calibration," URL=http://research.microsoft.com/research/pubs/view.aspx?tr_id=212.

* cited by examiner

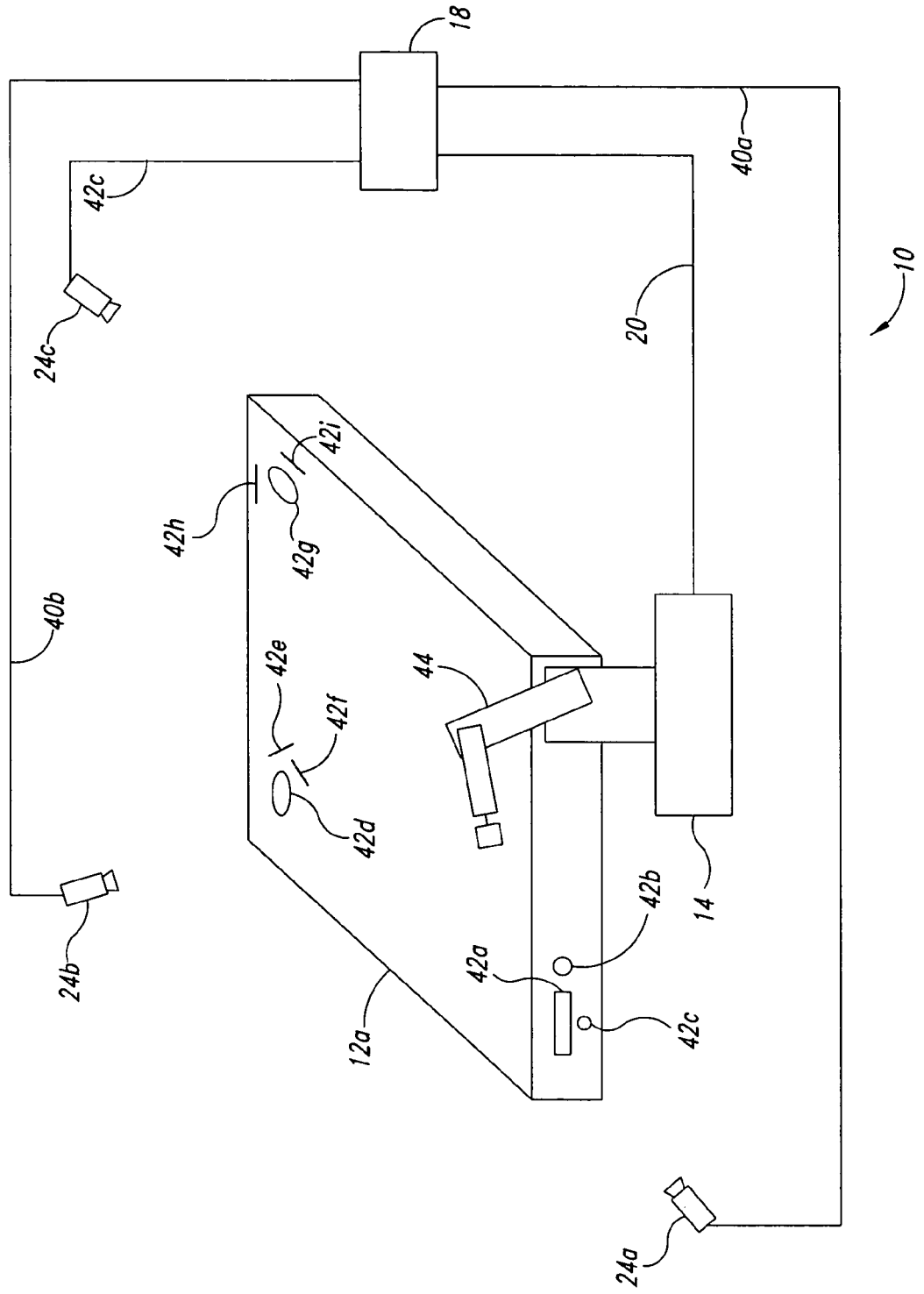

METHOD AND APPARATUS FOR MACHINE-VISION

CROSS-REFERENCE TO RELATED APPLICATIONS

This application claims benefit under 35 U.S.C. 119(e) to U.S. provisional application Ser. No. 60/587,488, filed Jul. 14, 2004.

BACKGROUND OF THE INVENTION

1. Field of the Invention

This disclosure relates to the field of machine vision, which may be useful in robotics, inspection or modeling.

2. Description of the Related Art

Increasingly more manufacturing operations are performed with the aid of industrial robots. Robots that had traditionally been used as blind motion playback machines are now benefiting from intelligent sensor-based software to adapt to changes in their surroundings. In particular, the use of machine vision has been on the rise in industrial robotics. A typical vision guided robotic system analyzes image(s) from one or more cameras to arrive at such information as the position and orientation of a workpiece upon which the robotic tool is to operate.

Early implementations of vision guided robots have provided only limited part pose information, primarily in the two-dimensional space whereby the movement of a given part is constrained to a planar surface. For example see U.S. Pat. No. 4,437,114 LaRussa. However, many robotic applications require the robot to locate and manipulate the target workpiece in three dimensions. This need has sparked many attempts at providing various three-dimensional guidance capabilities. In many past cases, this has involved using two or more cameras that view overlapping regions of the object of interest in what is known as a stereo configuration. The overlapping images or fields-of-view contain many of the same object features viewed from two or more vantage points. The difference amongst the apparent position of corresponding features in each of the images i.e., the parallax, is exploited by these methods to calculate the three dimensional coordinates of such features. For examples see U.S. Pat. No. 4,146,924 Birk et al., and U.S. Pat. No. 5,959,425 Bieman et al.

Many drawbacks exist that render stereo based systems impractical for industrial applications. The measurement error in such systems increases rapidly in response to image feature detection errors; these systems also require exactly known geometrical relationships between camera pairs. Furthermore stereo methods require the use of at least double the number of cameras which drives up the cost, complexity and the need for calibration.

Other attempts at locating objects with multiple cameras in the past have taken advantage of video cameras in combination with laser light projectors that project various stationary or moving patterns such as stripes, cross-hairs and the like upon the object of interest. These systems typically involve a combination of lasers and cameras that must be calibrated relative to a common coordinate system and rely on specific assumptions about the geometry of the object of interest to work. For example see U.S. Pat. No. 5,160,977 Utsumi.

Drawbacks of such attempts include the need for expensive specialized sensors as opposed to use of standard off-the-shelf hardware, the need for knowledge of exact geometric relationships between all elements of the system including cameras and lasers, susceptibility to damage or misalignment when operating in industrial environments as well as posing of a potential safety hazard when laser light sources are deployed in proximity of human operators.

Based on the above considerations it is desirable to devise a three-dimensional robot guidance system that eliminates the need for stereo camera pairs and the need for the use of structured light and specialized sensors. Such a system would increase accuracy, simplify setup and maintenance and reduce hardware costs.

Prior methods have been developed that utilize a single camera to view each region/feature of the object in order to calculate the 3D pose of the object. For example see U.S. Pat. No. 4,942,539 McGee, and European Patent No. 0911603B1 Ersu. However these and similar methods require the calibration of all cameras relative to a common coordinate frame such as a robot. In practice such a requirement is cumbersome and time-consuming to fulfill and difficult to automate. These methods also require a priori knowledge of the geometrical relationships between all object features used. One source for such data is object Computer Aided Design (CAD) models; however, such data files are often not readily available. In the absence of CAD data, past systems have relied on direct object measurement using a coordinate measurement machine or a robot equipped with a pointing device. This process is difficult and error prone especially in the case of large objects with features that are scattered in different regions.

It is therefore highly desirable to develop a three-dimensional robot guidance system that in addition to eliminating the need for stereo cameras and lasers, also eliminates the need for inter-camera calibration and the need for a priori knowledge of geometrical relationships between all object features.

BRIEF SUMMARY OF INVENTION

In one aspect, a method useful in machine-vision of objects comprises acquiring a number of images of a first view of a training object from a number of cameras; identifying a number of features of the training object in the acquired at least one image of the first view; employing at least one of a consistency of physical relationships between some of the identified features to set up a system of equations, where a number of unknowns is not greater than a number of equations in the system of equations; and automatically computationally solving the system of equations. The method may further determine a number of additional views to be obtained based at least in part on the number of image sensors, the number of features identified, the number of features having an invariant physical relationship associated thereto, and a type of the invariant physical relationship associated with the features, sufficient to provide a system of equations and unknowns where the number of unknowns is not greater than the number of equations. Where the invariant physical relationships are distances, the number of views may, for example, be determined by computationally solving the equation $m \geq (f^2 - f - 2k - 2r + 6(c - ck))/(f^2 - 3f) - 1$, where m is the number of views, f the number of features, k the number of known distances between pairs of the features, r is the number of rays with a known distance between a feature and an image sensor, c is the number of image sensors and ck is the number of known transformation between an imager sensor reference frame and a common reference frame.

In another aspect, a machine-vision system comprises at least one image sensor operable to acquire images of a training object and of target objects; processor-readable medium storing instructions for facilitating machine-vision for objects having invariant physical relationships between a number of features on the objects, by: acquiring a number of images of a first view of a training object from a number of cameras; identifying a number of features of the training object in the acquired at least one image of the first view; employing at least one of a consistency of physical relationships between some of the identified features to set up a system of equations, where a number of unknowns is not greater than a number of equations in the system of equations; and automatically computationally solving the system of equations; and a processor coupled to receive acquired images from the at least one image sensor and operable to execute the instructions stored in the processor-readable medium.

In still another aspect, a processor readable medium stores instructions for causing a processor to facilitate machine-vision for objects having invariant physical relationships between a number of features on the objects: by acquiring a number of images of a first view of a training object from a number of cameras; identifying a number of features of the training object in the acquired at least one image of the first view; employing at least one of a consistency of physical relationships between some of the identified features to set up a system of equations, where a number of unknowns is not greater than a number of equations in the system of equations; and automatically computationally solving the system of equations.

In a yet another aspect, a method useful in machine-vision of objects comprises acquiring a number of images of a first view of a training object from a number of cameras; identifying a number of features of the training object in the acquired at least one image of the first view; associating parameters to less than all of the identified features which parameters define an invariant physical relationship between either the feature and at least one other feature, the feature and the at least one camera, or between the at least one camera and at least another camera where an invariant physical relationship between each one of the features and at least one other feature is not known when associating the parameters before a runtime; determining a number of additional views to be obtained based at least in part on the number of cameras, the number of features identified, and the number of features having parameters associated thereto, sufficient to provide a system of equations and unknowns where the number of unknowns is not greater than the number of equations; and acquiring at least one image of each of the number of additional views of the training object by the at least one camera; identifying at least some of the number of features of the training object in the acquired at least one image of the number of additional views of the training object.

In even another aspect, a method useful in machine-vision for objects having invariant physical relationships between a number of features on the objects comprises in a pre-runtime environment: acquiring at least one image of a first view of a training object by at least one image sensor; identifying a number of features of the training object in the acquired at least one image of the first view; and associating a number of parameters to less than all of the identified features which define an invariant physical relationship between the either the feature and at least one other feature or between the feature and the at least one image sensor; determining a number of additional views to be obtained based at least in part on the number of image sensors acquiring at least one image, the number of features of the training object identified, the number of features having parameters associated therewith, and a type of invariant physical relationship associated with each of the parameter; acquiring at least one image of a second view of the training object by the at least one image sensor; and identifying at least some of the number of features of the training object in the acquired at least one image of the second view; and in at least one of a pre-run time environment or a runtime environment, computationally determining a local model using the identified features in each of a number of respective image sensor coordinate frames.

In still another aspect, a machine-vision system comprises at least one image sensor operable to acquire images of a training object and of target objects; processor-readable medium storing instructions for facilitating pose estimation for objects having invariant physical relationships between a number of features on the objects, by: in a pre-runtime environment: acquiring at least one image of a first view of a training object by at least one image sensor; identifying a number of features of the training object in the acquired at least one image of the first view; and associating a number of parameters to less than all of the identified features which define an invariant physical relationship between the either the feature and at least one other feature or between the feature and the at least one image sensor; determining a number of additional views to be obtained based at least in part on the number of image sensors acquiring at least one image, the number of features of the training object identified, the number of features having parameters associated therewith, and a type of invariant physical relationship associated with each of the parameter; acquiring at least one image of a second view of the training object by the at least one image sensor; and identifying at least some of the number of features of the training object in the acquired at least one image of the second view; and in at least one of a pre-run time environment or a runtime environment, computationally determining a local model using the identified features in each of a number of respective image sensor coordinate frames; and a processor coupled to receive acquired images from the at least one image sensor and operable to execute the instructions stored in the processor-readable medium.

In a further aspect, a processor readable medium stores instructions for causing a processor to facilitate machine-vision for objects having invariant physical relationships between a number of features on the objects, by: in a pre-runtime environment: acquiring at least one image of a first view of a training object by at least one image sensor; identifying a number of features of the training object in the acquired at least one image of the first view; and associating parameters to less than all of the identified features which define a physical relationship between the either the feature and at least one other feature or between the feature and the at least one image sensor; and determining a number of additional views to be obtained based at least in part on the number of image sensors acquiring at least one image and the number of features of the training object identified; acquiring at least one image of a second view of the training object by the at least one image sensor; and identifying at least some of the number of features of the training object in the acquired at least one image of the second view; and in at least one of a pre-run time environment or a runtime environment, computationally determining a local model using the identified features in each of a number of respective image sensor coordinate frames.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2A is a schematic view of the machine-vision system of FIG. 1 interacting with a training object located at a first position, according to one illustrated embodiment

DETAILED DESCRIPTION

Figure 1:
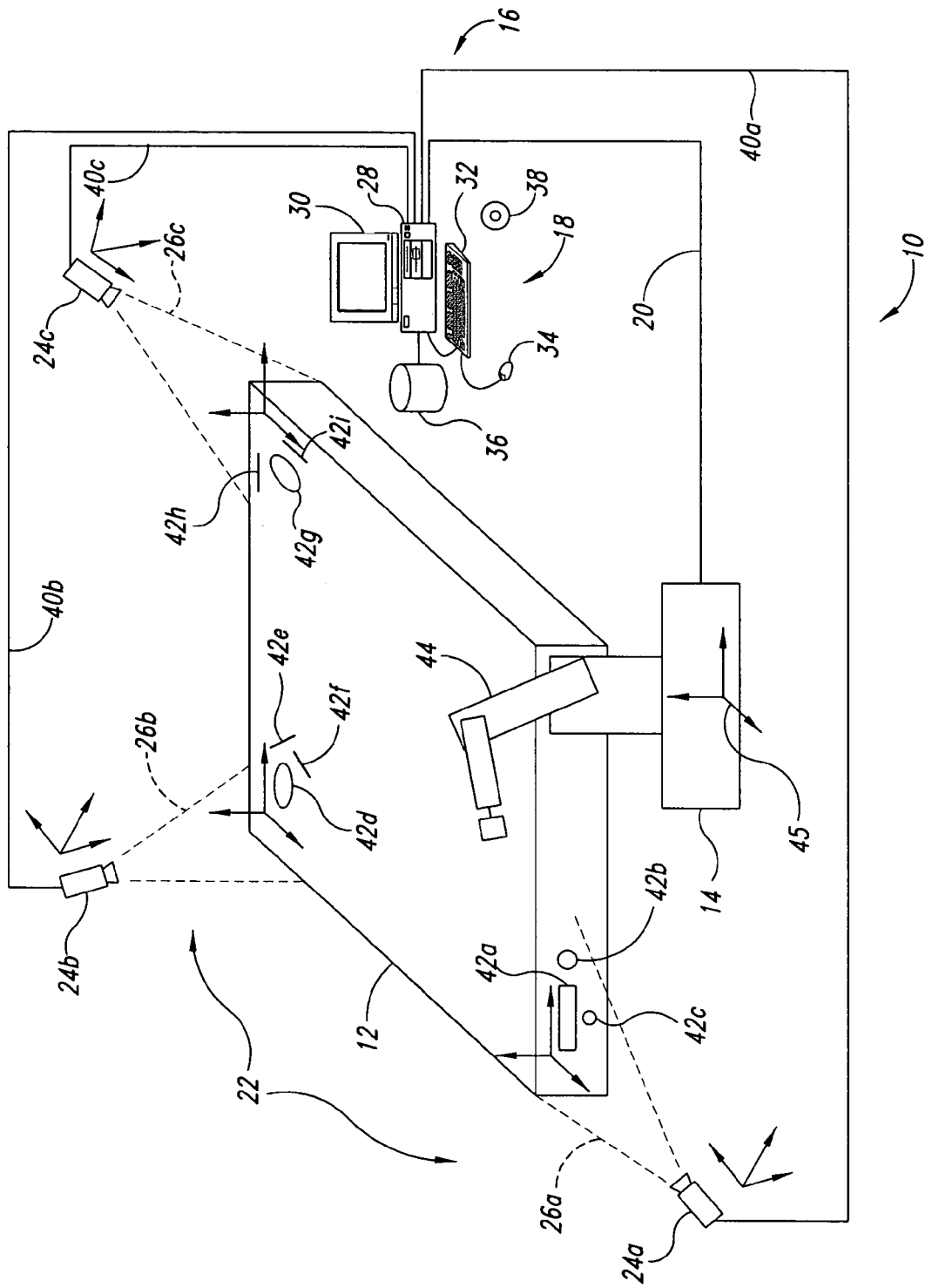
FIG. 1 is a schematic view of a machine-vision system interacting with a target object according to one illustrated embodiment, the machine-vision system including a computing system, an imaging system and a robot.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with robotic systems, robots, computing systems, processors and/or image sensors have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the embodiments.

Disclosed herein is a machine-vision system and method, which in some embodiments may be used automatically or semi-automatically determining the position and orientation of a target object in three-dimensional space ("3D Pose"). The determination of the 3D Pose of the target object in an external coordinate system such as a robot related coordinate reference frame is performed using one or more images sensors such as cameras to locate object features or landmarks. Each image sensor may observe a different region of the target object containing one or more features, allowing the machine-vision system to be very robust with respect to partial occlusions and loss of image from individual image sensors. The apparent locations of the features are used to determine the image feature positions or local models, which in turn are processed together with sparse model information in order to find the rotation and translation of the target object relative to a robot coordinate reference frame. The calculated object 3D Pose may be used to transform a robot path of operation so that this path aligns with the current position of the target object.

In at least one embodiment, the machine-vision system may implement some or all of the following method. Calibrating the image sensors by: calculating the intrinsic parameters for each image sensor; and calculating the pose of at least one image sensor (the "Reference Camera") relative to an external coordinate system. Training the object features by: capturing or acquiring images of a training object using each image sensor pointed at a specific region of the training object while the training object is placed in the first 'imaging position'; the collection of images taken in the first imaging position is described as the first view or view 1; selecting visible geometric features present in the images e.g., lines, contours, circles, etc.; and inputting the sparse model information; in other words the geometric physical relationships (e.g., distances, areas, volumes, etc) between some of the selected features. Training the object by acquiring more views by: based on the number of selected features and the degree of sparse model information provided, compute the number of additional views; move the training object and/or image sensors as a system, keeping at least two of the features in the field-of-view; acquire image of additional view; and repeatedly moving the training object and acquisition of images for each of the determined number of additional views. Computing 3D object position by: extracting the trained features from images of all views, computing 3D feature positions in respective image sensor coordinate frames by solving a system of equations; calculating object 3D pose using results from solving the system of equations.

As used herein model-based pose determination refers to a class of algorithms for determining the 3D pose of an object using one or more images of the object captured or acquired using one or more image sensors from one or more imaging positions whereby the apparent location of object features and information about the relationship between object features is exploited along with the assumption of rigidity of said features i.e., constant physical relationships. A camera generally refers to a device that comprises a lightproof chamber with an aperture fitted with a lens and a shutter through which the image of an object is projected onto a surface for translation into electrical impulses. An object generally refers to an item having distinct features (i.e., object features). An image refers to a physical or simulated representation of an object of interest captured or acquired from a given physical or virtual vantage point. An imaging position is one relative position of object and image sensors whereby the relationship between the former and the latter remains constant for the duration of image capture or acquisition by all image sensors. If the object is moving this effect can be accomplished using high-speed imaging and lighting techniques. A view generally refers to a collection of images taken at a given imaging position. An object feature or feature generally refers to a visible property of an object in an image. For example, an arc outlining a hole on the object or the visible edges outlining an artificial marker attached to the object or virtual properties generated from the visible properties e.g., mathematically or the result of interaction of a light source such as a Laser light source with features on the object. A ray refers to the line that passes through a center of an image sensor and an image feature, and corresponding object feature.

FIG. 1 shows a machine-vision system 10 and a work piece or object 12. The machine-vision system 10 includes at least one robot 14, at least a portion of which may be selectively positioned with respect to the object 12. The machine-vision system 10 also includes a control system 16 which may include a computing system 18, that provides control signals by a signal path 20 to control the robot 14. The signal path 20 may take the form of any wired and/or wireless communications mediums, suitable for either parallel or serial communications The control system 16 may also include an image acquisition system 22, which include one or more image sensors 24a, 24b, 24c each having a respective field-of-view (broken lines) 26a, 26b, 26c positioned to acquire images of portions of the object 12.

The computing system 18 may include a computer 28 including one or more processors, memories, and buses. The computing system 18 may also include one or more input/output devices, for example a display 30, keyboard 32 and pointing devices such as a mouse 34. The memory may for example, include one or more read only memories (ROMs), random access memories (RAM), hard disks 36 (shown externally located from the computer 28 for ease of illustration), one or more removable memories 38, for example floppy disks, CR-ROMs, optical disks, Winchester drives or the like. The memories statically or dynamically store instructions and data for operation of the processor, as explained in detail below.

The image sensors 24a, 24b, 24c may take any of a variety of forms capable of capturing or acquiring a two-dimensional image of the object 12. In typical applications the image sensors 24a, 24b, 24c will take the form a video cameras or digital still cameras. The image sensors 24a, 24b, 24c are coupled by one or more signal paths 40a, 40b, 40c to supply image data to the computer 28. The signal paths 40a, 40b, 40c may take the form of any wired and/or wireless communications mediums.

In particular, the image sensors 24a, 24b, 24c are positioned to acquire images of various features on the object 12. Thus, for example, a first image sensor 24a acquires images of features 42a, 42b, 42c, while a second image sensor 24b acquires images of features 42d, 42e, 42f, and the third image sensor 24c acquires images of features 42g, 42h, 42i. In most applications, the image sensors 24a, 24b, 24c will acquire images that include at least some of the same features 42a-42i. The field-of-view of each image sensor 24a-24c is selected such that an adequate number of part features are visible in each view. The features 42a-42i may be visually distinctive features inherent in the object 12, for example slots, holes, or other apertures, lines, and/or edges. Additionally, or alternatively, the features 42a-42i may be visually distinctive features placed, located, etched or inscribed on the object 12, for example decals, stickers, or slots, holes or other apertures, provided on the object 12 solely for recognition by the machine-vision system 10.

In the illustrated, the robot 14 has a movable arm 44 which may be selectively positioned with respect to the object 12. Alternatively, in some embodiments multiple portions of the robot 14 or the entire robot 14 may be selectively positioned with respect to the object. For example, where the entire robot 14 is selectively positionable, the object 12 may take the form of an environment in which the robot 14 is contained, such as the walls forming a room. In such an embodiment, the features 42a-42i may be some common element that has fairly standard dimensions, for example electrical outlet covers. Alternatively, markings may be applied to the environment solely for recognition by the machine-vision system 10.

FIG. 2A shows a training object 12a at a first pose (i.e., position and/or orientation) with respect to the imager sensors 24a, 24b, 24c, such that the image sensors 24a, 24b, 24c are able to acquire respective images corresponding to a first view of a training object 12a. The training object 12a should be similar or identical in appearance to the actual or "target" objects that the robot 14 will be manipulating or otherwise interacting with.

Figure 2B:
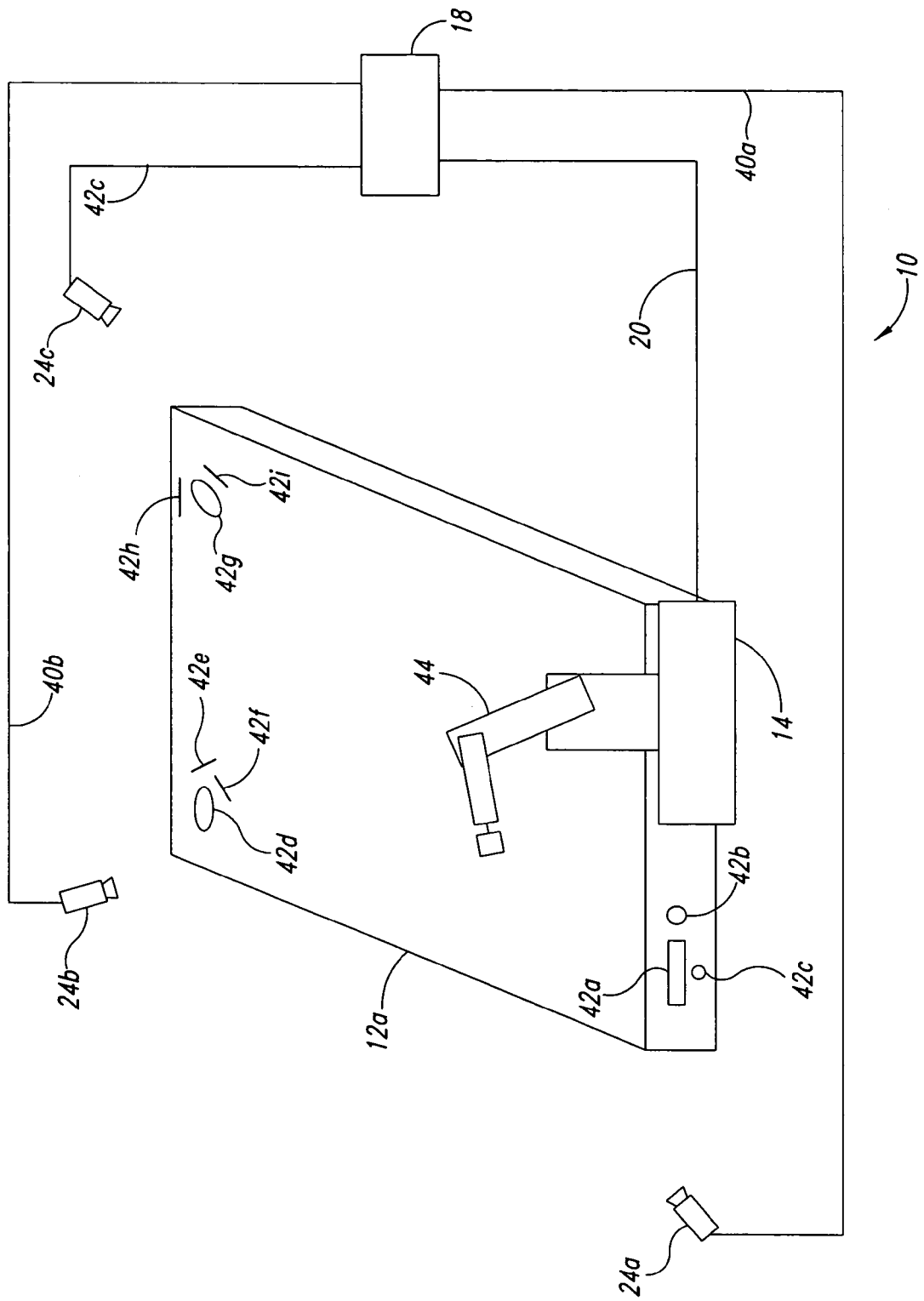
FIG. 2B is a schematic view of the machine-vision system of FIG. 1 interacting with the training object of FIG. 2A located at a second position, according to one illustrated embodiment.
Figure 3B:
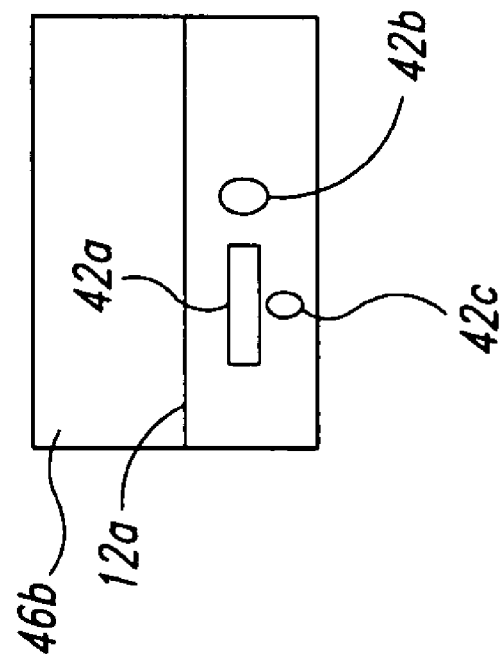
FIG. 3B is a representation of an image acquired by the first image sensor of the training object in the second position.
Figure 3A:
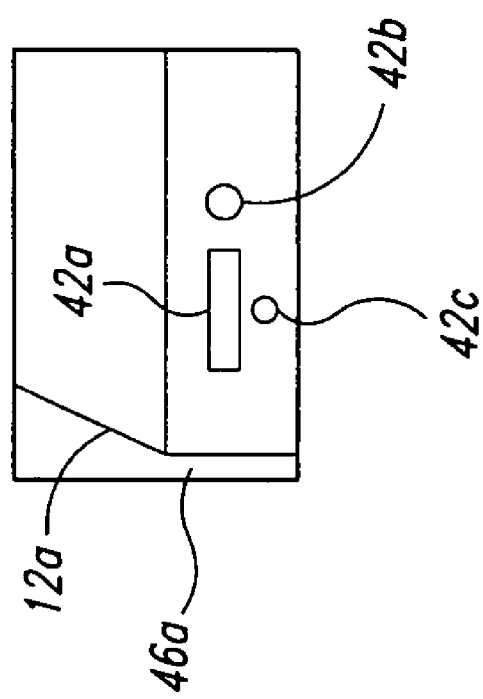
FIG. 3A is a representation of an image acquired by a first image sensor of the training object in the first position.

FIG. 3A shows one of the images 46a of the first view (FIG. 2A), acquired by the first image sensor 24a. A number of features 42a-42c are visible in the image 46a. While the few features 24a-24c explicitly called out in FIG. 2A are slots or holes, the image 46a may include other features, such as the edges and/or corner of the training object 12a.

FIG. 2B shows the training object 12a at a second pose (i.e., position and/or orientation) with respect to the imager sensors 24a, 24b, 24c, such that the image sensors 24a, 24b, 24c are able to acquire respective images corresponding to a second view of the training object 12a.

FIG. 3B shows one of the images 46b of the second view (FIG. 2B), acquired by the first image sensor 24a. At least some of the features 42a-42c visible in the image 46a are also visible in the image 46b. As discussed in detail below, the machine-vision system 10 may acquire at least one image by at least one image sensor 24a, 24b, 24c of the training object 12a at various poses to advantageously produce images of multiple views of the training object 12a.

Figure 4:
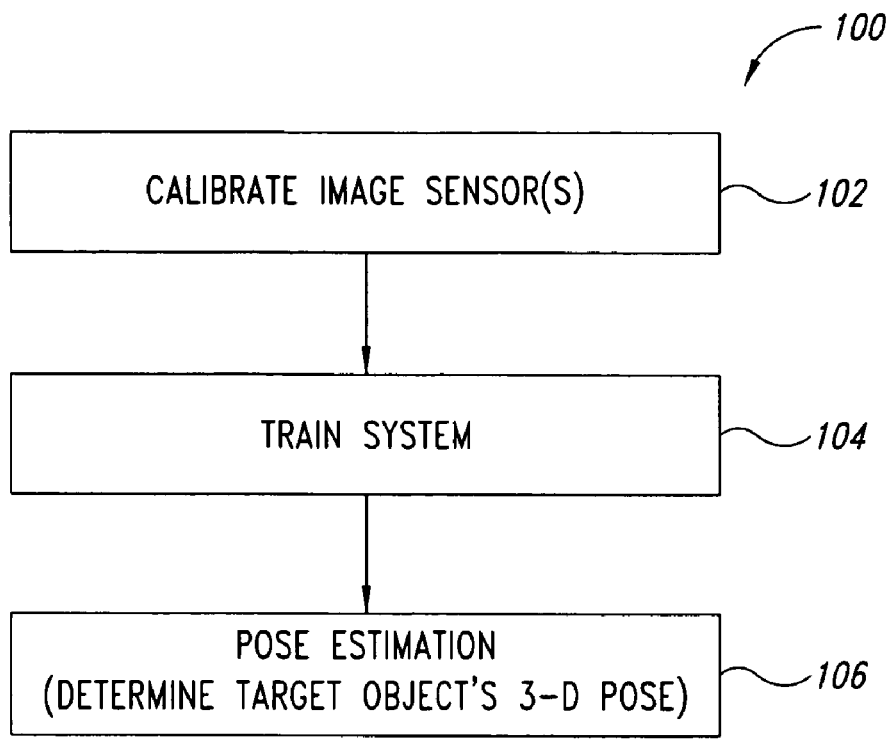
FIG. 4 is a flow diagram showing a high level method of facilitating machine-vision which may include pose estimation, according to one illustrated embodiment.

FIG. 4 shows a high level method 100 useful in facilitating pose estimation, according to one illustrated embodiment. The method 100, or portions thereof, may be executed by a processor, for example based on instructions stored on a processor-readable medium 36, 38 (FIG. 1).

At 102, the image sensors 24a-24b are calibrated. Calibration occurs during setup, prior to a runtime. At 104, the machine-vision system 10 is trained. Training also occurs during setup, prior to the runtime. Optionally, the computing system 18 estimates the pose of a target object 12 (FIGS. 2A, 2B, 3A, 3B) at 106. Pose estimation occurs following set up, during the runtime, for example in a production mode. That is during operation of the system to recognize features of target objects during intended operation. In some embodiments, the machine-vision system 10 may be employed for tasks other the pose estimation, for example, inspection or modeling. Calibration, training and pose estimate are each discussed in detail below, with reference to FIGS. 5-11.

Figure 5:
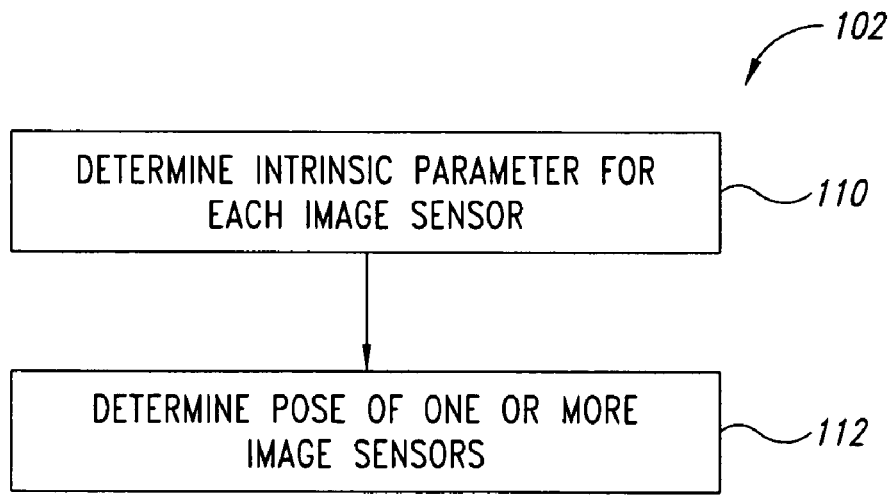
FIG. 5 is a flow diagram showing a method of calibrating image sensors, according to one illustrated embodiment.

FIG. 5 shows a method 102 of calibrating the image sensors 24a-24c, according to one illustrated embodiment.

At 110, the intrinsic parameters for each image sensor 24a-24c is determined. Intrinsic calibration is performed for all the image sensors 24a-24c, and involves the determination of the internal parameters such as focal length, image sensor center and distortion factors. An explanation of the preferred calibration algorithms and descriptions of the variables to be calculated can be found in commonly assigned U.S. Pat. No. 6,816,755 issued on Nov. 9, 2004, and pending application Ser. No. 10/634,874. The method may employ any of the many other known techniques for performing the intrinsic calibration.

In some embodiments, the intrinsic calibration of the image sensors 24a-24c may be performed before installation in the field. In such situations, the calibration data is stored and provided for each image sensor 24a-24c. It is also possible to use typical internal parameters for a specific image sensor, for example parameters associate with particular camera model-lens combinations.

At 112, extrinsic calibration may be preformed by determining the pose of one or more of the image sensors 24a-24c. For example, one of the image sensors 24a may be calibrated relative to a robot coordinate system 45 (FIG. 1), while the other images sensors 24b, 24c are not calibrated. Through extrinsic calibration the relationship (i.e., 3D transformation) between an image sensor coordinate reference frame and an external coordinate system (e.g., robot coordinate reference system) is determined, for example by computation. In at least one embodiment, extrinsic calibration is performed for at least one image sensor 24a-24c to a preferred reference coordinate frame, typically that of the robot 14. An explanation of the preferred extrinsic calibration algorithms and descriptions of the variables to be calculated can be found in commonly assigned U.S. Pat. No. 6,816,755 issued on Nov. 9, 2004 and pending application Ser. No. 10/634,874. The method may employ any of the many other known techniques for performing the extrinsic calibration.

Some embodiments may omit extrinsic calibration of the image sensor(s) 24a-24c, for example where the method is employed only to create a comprehensive object model without performing pose estimation with respect to an external coordinate system, such as the robot coordinate system 45.

Figure 6:
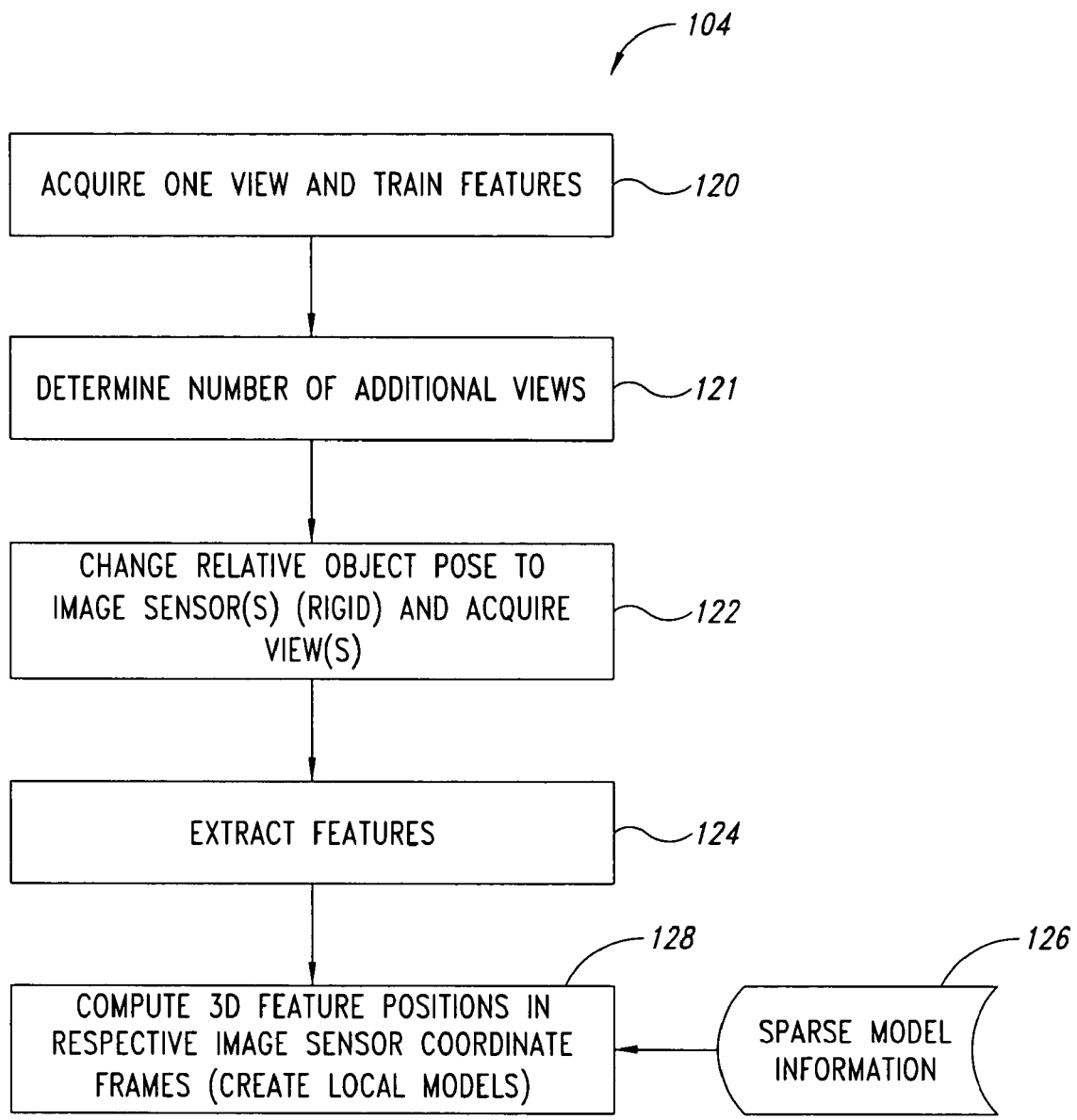
FIG. 6 is a flow diagram showing a method of training object features on the machine-vision system, according to one illustrated embodiment.

FIG. 6 shows a method 104 of training the machine-vision system 10 with respect to features of the training object 12 (FIG. 1) according to one illustrated embodiment. Training refers to the process whereby an object and its attributes are introduced to the machine-vision system 10. During the training process, images of the training object 12a are captured or acquired and various landmark features are selected whose geometrical properties are determined and stored. In some embodiments the images may be stored along with sparse model information, while in other embodiments feature information extracted from the images may be stored along with the sparse model information. During the operation of the machine-vision system 10, the latter information is used in conjunction with runtime data to compute a 3D pose of a target object 12. The data stored at training may be referred to as the 'Training Set'. The Training Set is constructed by analyzing images of the training object 12a captured or acquired by various image sensors or cameras 24a-24c in one or more positions.

During the object feature training process, images in a given view of the training object 12 are used to select various features, for some of which sparse model information is introduced and stored along with the images for each view. Alternatively feature information can be extracted from the images and stored, whereby images need not be stored.

At 120, a first view of the training object 12 (FIG. 1) is acquired, and the features 42a-42i are trained. For example, FIG. 1 depicts the training object 12 (e.g., car body) in a first imaging position. The training object 12 is stationary when each image sensor 24a-24c is instructed to acquire or capture a single image of its respective field of view 26a-26c. The field of view 26a-26c of each image sensor 24a-24c is selected such that one or more object features are visible in each view.

The process of selecting object features 42a-42i suitable for pose determination may range from fully automatic to strictly user-driven. In one semi-automatic embodiment, the acquired images are presented to the user via a graphical user interface on the display 30 (FIG. 1). To assist the user, the computing system 18 may perform a degree of analysis on the images (e.g., highlight high contrast areas of the images) to point out suitable candidates to be used as features 42a-42i. This information is then overlaid on the images from each image sensor 24a-24c and presented to the user. The user then proceeds by selecting visible geometric features 42a-42i present in the images. For example, the features 42a-42i may include lines, edges, contours, circles, corners, centers, etc that are deemed to be suitable and reliable.

In some embodiments, the user may create one or more local models per image sensor 24a-24c. One or more object features 42a-42i may be assigned to each local model. The assigned object features 42a-42i are then broken down into a series of basic geometric entities ("primitives") such as points and lines. Alternatively the feature selection and local model assignment may be performed automatically by the computing system 18 based on preset criteria.

In such embodiments, various model-based techniques can be used to calculate the 3D pose of a local model. The degree of freedom to which this pose can be calculated depends on the total number of primitives obtained by breaking down the object features, the proportions of various primitives and the specific model-based method used. For example, a local model may be constructed from a single circular feature. The circle in this case can be broken down to multiple 'point' type primitives by selecting invariant points along the perimeter. The resulting local model is capable of providing from three to five degrees of freedom depending on available image resolution and required accuracy. In contrast a local model built by combining a square object feature and a circular object feature can be set up produce a total of five point type primitives (e.g., one from the center of the circle and four from the four corners of the square). This local model would be capable of providing a full six degrees of freedom pose relative to the respective image sensor 24a-24c. In essence the same object feature(s) (e.g., circular feature) may be broken down into primitives differently based on the availability of other features as well as the application requirements in terms of desired degrees of freedom to which the pose of the object is to be calculated. To complete the training of the local model, the machine-vision system 10 calculates and stores the current 3D pose of each local model (with the associated degrees of freedom) in the respective camera coordinate frame ("local model Reference Pose"). For instance in the case of the local model constructed using a singular circular feature, the 3D pose of the model with three to five degrees of freedom is calculated by a) decomposing the circular feature to provide 5 or more point primitives by selecting invariant points on the perimeter of the circle; and b) using the Single Camera 3D method as cited in commonly assigned U.S. Pat. No. 6,816,755 and U.S. non-provisional patent application Ser. No. 10/634,874 to calculate the relative 3D pose of the local model to the camera coordinate frame.

Returning to FIG. 6, depending on the specific parameters and configuration of a given machine-vision system 10, the training may require imaging the training object 12 at more than one position (i.e., multiple views acquired or captured at multiple imaging positions). Thus, at 121 the computing system 18 or the user determines a number of additional views at which images will be acquired. The number of additional views, in addition to the first view, is determined as described below, where f is the number of features, m is the number of measurements (capture or acquire positions, views), r is the number of known rays (i.e., when the distance from a center of the image sensor to a feature on the object 12 is known), c is the number of image sensors or cameras, and kd is the number of known distances between features.

There is a solution where c is greater than or equal to 1 and f is greater than or equal to 4, and either r is greater than or equal to 2 or k is greater than or equal to 1. Solutions are also possible with three features (i.e., f equal 3), if r+k equals 3 (e.g., {r=3 AND k=0} or {r=2 AND k=1} or {r=1 AND k=2} or {r=0 AND k=3}), and m is greater than or equal to 2. Also, if more invariant physical relationships, other than distances like angles, are used to build the system of equations, one known distance can be enough to solve the system of equations (i.e., find the pose) for three features.

In some instances it may be useful to move the training object 12 in one or more (m) different positions keeping the features 42a-42i in the field-of-view 26a-26c of each image sensor 24a-24c where m is calculated as set out immediately below.

In the general case, when the relationship between some or all image sensors 24a-24c is known:

$$m \geq (f^2 - f - 2k - 2r + 6(c - ck - 1))/(f^2 - 3f) - 1 \text{ where } k \geq 1, c \geq 1, ck \geq 0 \quad \text{Equation 0}$$

When c is equal to 1, then ck is equal to 0 (i.e., no physical relationship exist between image sensors 24a-24c, since there is only a single image sensor 24a.

When the relationship between all image sensors 24a-24c is known (i.e., c=ck+1), the equation 0 becomes:

$$m \geq (f^2 - f - 2k - 2r)/(f^2 - 3f) - 1, \text{ where } k \geq 1$$

For both cases: c greater than or equal to 1 and f greater than or equal to 4 and (r greater than or equal to 2 or k greater than or equal to 1) above applies. All equations are true in the case of using only distances as invariant physical relationships. If more invariant physical relationship are used then m (i.e., number of views) decreases accordingly.

Based on the outcome at 120, the pose of the training object relative to the image sensors 24a-24c is optionally changed at 122, and additional views of the training object 12 are acquired. To arrive at various imaging positions, the training object 12 and/or the image sensors 24a-24c can be moved relative to each other. If the image sensors 24a-24c are moved, then the relationship between the image sensors 24a-24c in the new position should be known or remain the same as the other positions ("moved as a system"). Once the new imaging position is achieved images of a new view are acquired. The same process is repeated as many times as indicated by the aforementioned algorithm to complete the training for the given setup. The images in every view may be stored as part as the training. Alternatively, feature information can be extracted from the images and stored whereby images need not be stored.

At 124, features are extracted from the additional views of the training object 12. Extraction is discussed in more detail below with reference to FIG. 7.

At 126, sparse model information is provided to the computing system 18. The sparse model information describes the geometrical physical relationships between object features or the geometrical attributes of a single feature (e.g., diameter of a circular feature) from which the former may be calculated, for less than all selected features. The sparse model information may be sourced from a CAD model of the object, measured directly or calculated.

At 128, the computing system 18 computes the three-dimensional positions of the features in the respective coordinate frames associated with each image sensor 24a-24c, for creating local models.

Figure 7:
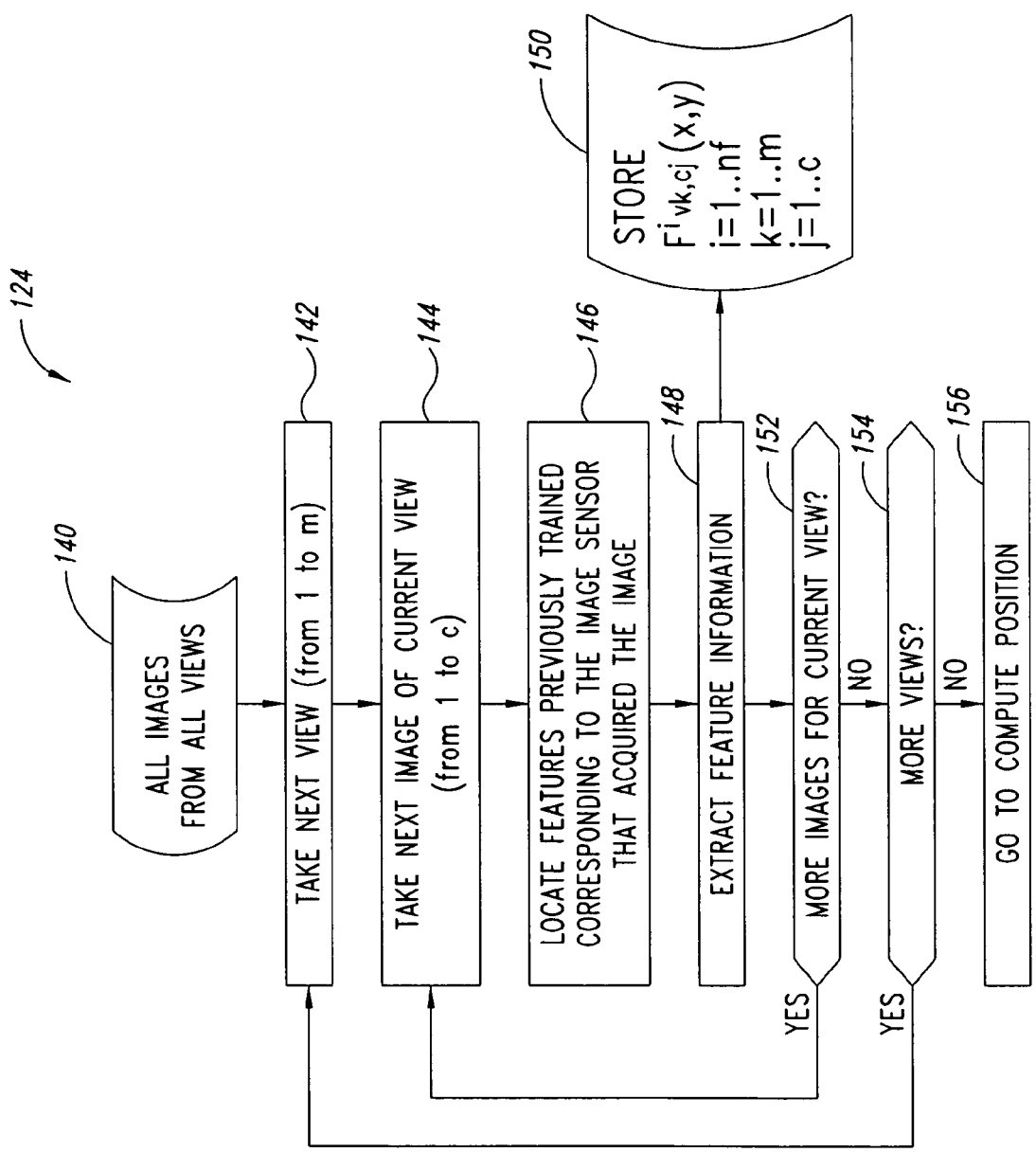
FIG. 7 is a flow diagram showing a method of extracting features from captured or acquired images, according to one illustrated embodiment.

FIG. 7 shows a method 124 of extracting features according to one illustrated embodiment.

At 140, the computing system 18 starts with all acquired images from all views. At 142, the computing system 18 executes a first loop for processing the views (e.g., 1 to m) one at a time. At 144, the computing system 18 executes a second loop for processing each image (e.g., 1 to c) from a particular view, one at a time. At 146, the computing system 18 locates features in the image, that were previously trained for the respective image sensor that acquired the current image. At 148, the computing system 18 extracts feature information, such as position. At 150, the computing system 18 stores the extracted feature information. The feature information may, for example, be stored as an indexed list of the X and Y coordinates in the image or image sensor reference frame of all features in the particular image, and in some embodiments may include additional feature information, for example the radius of a circle, center points of an ellipse, etc.

At 152, the computing system 18 determines whether there are additional images for the current view. If there are additional images for the current view, control returns to 144 to process the next image. If there are not additional images for the current view, control passes to 154, where additional images for the current view determines whether there are additional views. If there are additional views, control passes to 142 to process the next view. If there are not additional views, control passes 156, to computed the target object 12 position or pose.

Figure 8A:
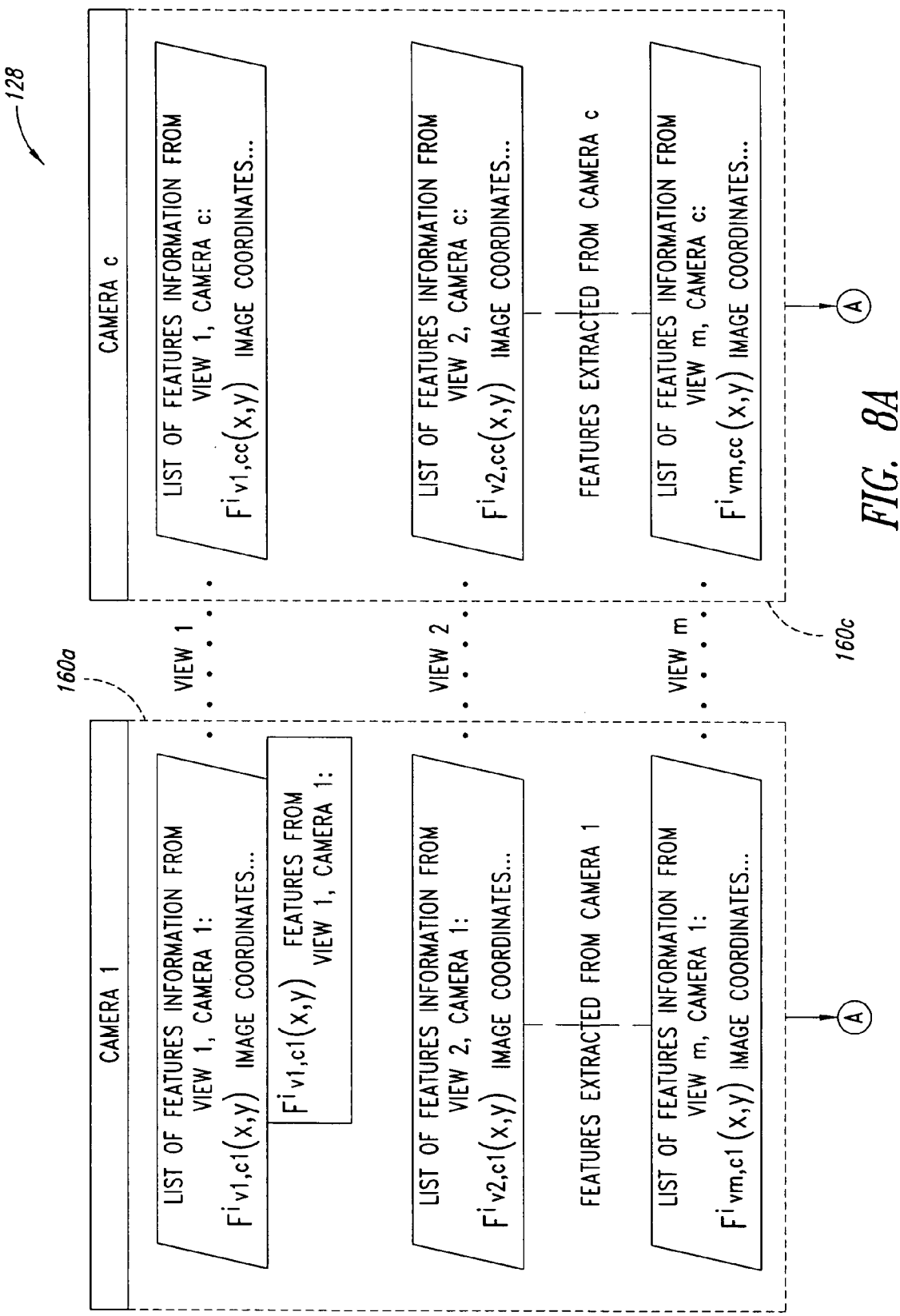
FIGS. 8A and 8B are a flow diagram showing a method of computing three-dimensional positions of the features in the respective coordinate reference frames associated with each image sensor, according to one illustrated embodiment.
Figure 8B:
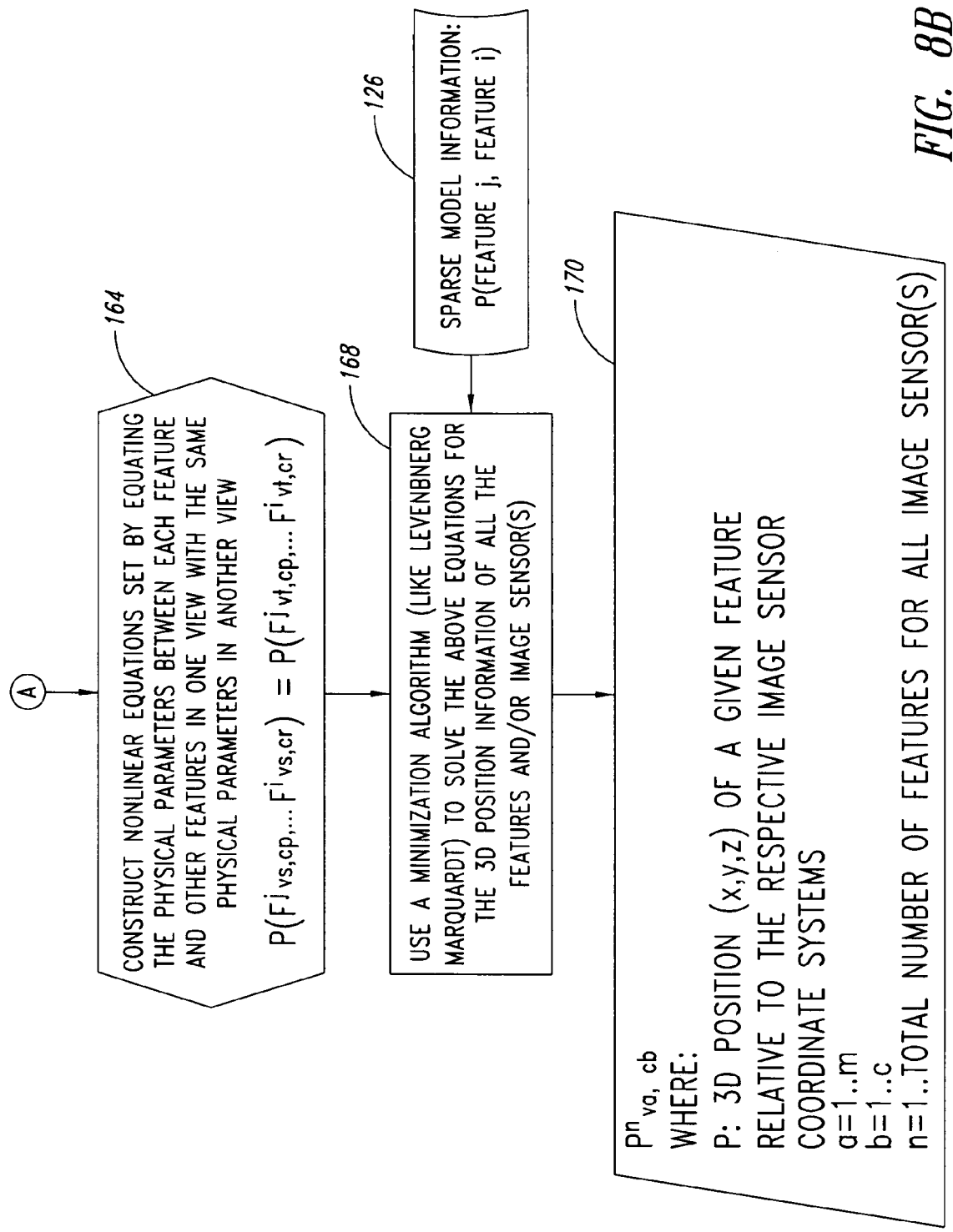

FIGS. 8A and 8B show a method 128 of computing three-dimensional positions of the features in the respective coordinate frames associated with each image sensor 24a-24c. Such may be used for creating local models, according to one illustrated embodiment. In particular, the method 128 is described with respect to information extracted from images acquired by each of a plurality of image sensors, a first set of extracted information 160a which is denominated as "camera 1," and a second set of extracted information 160c which is denominated as "camera c" 24c. The method 128 is applicable sets of information extracted from images acquired by additional images sensors 24a-24c, which sets of information are not explicitly illustrated in FIGS. 8A-8B for sake of brevity and clarity of presentation.

The sets of extracted information 160a, 160c may include lists of features information from each of a plurality of views (e.g., views 1 to m), for the respective image sensor 24a-24c, for example the coordinates of the particular features 42a-42i in the image reference frame coordinate system. The features information may be represented with nomenclature for convenience, or for use in referring to the particular information in a software program, routine or function for processing the feature information. The nomenclature adopted represents a specific feature by the letter F, followed by a superscript that identifies the particular feature, a first subscript that identifies the particular feature, and a second subscript identifies the particular image sensor. Again, the features information may include the X, Y coordinates of the features in the reference frame of the corresponding image sensor 24a-24c, and may include additional information.

At 164, the computing system 18 constructs a nonlinear set of equations by equating the distances between each features 42a-42i and all other features 42a-42i in one view with the same distances in another view. Using the above nomenclature, such may be mathematically represented as:

$$P(F^j_{vs,cp}, F^i_{vs,Cr}) = P(F^j_{vt,cp}, F^i_{vt,cr})$$

At 126, sparse model information is employed by the computing system 18. The sparse model information may take a variety of forms, for example distances between various features 42a-42i, between various image sensors 24a-24c, and/or between various features 42a-42i and image sensors 24a-24c At 168, the computing system 18 uses a minimization algorithm to solve the set of equations for the three-dimensional position information at least some, if not all of the features. At 170, the computing system 18 stores the three-dimensional position information to suitable processor-readable medium such as RAM.

It is noted that if the physical relationship between image sensors 24a-24c is not known, these relationships are determined as part of method 128. In such a case, the number of positions (m) is determined based on the general case set out above. In some embodiments, the previously described methods may be employed to determine the positions and orientations of the various image sensors, advantageously automating and simplifying to installation of machine-vision systems.

In some embodiments, the computing system 18 will determine the three-dimensional position of a target object 12 in an external coordinate system, such as a robot coordinate system 45. An overview of such a process will be described, followed by a discussion of a number of more specific methods for performing such a process.

As discussed in detail above, the computing system 18 searches each image to find as many of the trained features for each image sensor 24a-24c as possible. Alternatively, the computing system 18 may employ previously stored feature information.

The position of features in the image coordinate frame is therefore used in conjunction with the sparse model information stored during training to compute the pose of each feature or each local model in respective image sensor coordinate frame by setting up and solving a non-linear system of equations according to the algorithm described in the previous section. The computation may done to as may degrees of freedom as possible, or as desired.

Features are selected from the two views (i.e., runtime and training views) and features positions are transformed from each image sensor frame to the common reference frame. These transformed positions are then used to compute the 3D object pose (see FIG. 9).

The 3D object pose may be determined using any number of known methods. For instance in the case of a local model constructed using a singular circular feature, the 3D pose of the local model with three to five degrees of freedom relative to the current camera is calculated by a) decomposing the circular feature to provide 5 or more point primitives by selecting invariant points on the perimeter of the circle; and b) using the Single Camera 3D method as cited in U.S. patent applications Ser. Nos. 10/153,680 and 10/634,874 to calculate the relative 3D pose of the Local Model created in step b) to the camera coordinate frame.

Where the concept of local models is employed, the calculation of the position of each local model at training time and at runtime in the Reference Camera coordinate frame using the local model reference pose in each respective camera coordinate frame stored at training and the current local model pose in the same respective frame may be computed as described above. To accomplish this, the method takes advantage of the rigidity of the object and the constancy of the geometrical relationships between its features and therefore between the local models. This property is exploited by way of forming a system of n equations and m unknowns whereby the unknowns are made up of pose elements of the local models in the reference camera coordinate frame at training and at runtime. For instance, such a system of equations can be constructed by equating the formulae for distances between local models at training time and at runtime. Similar systems of equations may be constructed by equating not only the relative distances between local models but also their relative 3D orientation in cases when the said local models provide such pose information.

The number of equations (n) and unknowns (m) is affected by a multitude of factors such as the number of image sensor or cameras, the number of local models, the number of degrees of freedom provided by each local model, and the number of positions in which the object should be imaged to complete the Training Set (Imaging Positions). The following mathematical formula explains how each factor affects the values of m and n. For each specific application, the system parameters must be adjusted so as to provide n (left hand side of the following inequality)>=m (right hand side of the following inequality) resulting in a system of equations that can be solved.

$$\frac{6*t!}{(t-2)!}\sum_{i=1}^{C}\left[M_{c_i} * \sum_{j=i+1}^{C} M_{c_j}\right] \geq 12*(C-1) + 3t*\sum_{i=1}^{C}\sum_{j=1}^{M_{c_i}}\left[6 - F_{m_{c_i}^j}\right]$$

where:
- t: number of Imaging Positions required to complete the Training Set +1
- C: number of image sensors or cameras
- $C_i$: ith camera
- $M_{Ci}$: number of local models for the ith image sensor or camera
- $m^j_{Ci}$: the jth model of the ith image sensor or camera
- $F_{m^j_{Ci}}$: the number of degrees of freedom of the jth model of the ith image sensor or camera For instance, given a system that consists of four image sensor or cameras (i.e., C=4) viewing one local model (i.e., $M_{Ci}$=1) per image sensor for all i, with each local model capable of producing a 3 degrees of freedom pose (i.e., x, y, z coordinates) or $F_{m}{}^{j}{}_{Ci}=3$ for all i and j, the above inequality may be solved to yield the number of viewing positions t resulting in the requirement of two or more viewing positions (i.e., t>=2). In other words given the above parameters, the object needs to be viewed (imaged) in two different positions to complete the training process.

The pose of local models in the reference camera frame at training and runtime provide the necessary information to calculate the transformation between the pose of the entire object at training and at runtime in the reference camera coordinate frame. The specific steps followed here are dependent on the number of local models and the degrees of freedom provided by each. If for instance, there exist three local models providing a three degrees of freedom pose each, the task of calculating said object transformation from training to runtime involves calculation of the parameters for two 3D planes (frames) corresponding to the training and runtime poses of the local models and then computing the transformation between these planes. In other cases whereby there exists a larger number of local models and/or when some or all local models provide more or less degrees of freedom, more elaborate means of 'fitting' or 'morphing' may be used to reconcile the redundant pose data from various local models.

In some embodiments, the machine-vision system 10 may be employed for guiding the robot 14. In some such embodiments, the training process also involves training of an operational path of the robot 14 with respect to the target object 12. This task is independent of the object training process and may be undertaken at any point throughout the training process. The path may be generated through manual robot path training by a human operator or user, or by an offline robot path simulation software package that can generate the path using object CAD data. The path generation may take place at other points in the overall training process.

Training the operational path may, for example, include acquiring a training view (i.e., robot training view) with the training object 12a in a position where robot path training is desired. A 3D transformation between the runtime view and the robot training view may be determined by transforming the 3D features positions calculated for each view to a common reference frame. These transformed positions may be used to compute the transformation of the object pose between the two views (see FIG. 10).

Once the transformation describing the movement or difference in the pose of the object from training time view and runtime view is determined, the transformation may be transmitted to a controller of the robot 14 for adjusting the intended path of operation. The robot controller may be implemented by the computing system 18, or by a separate controller which may, or may not be an integral part of the robot 14. There are several options for communicating the object 3D pose data. These include '3D Offsets', 'Transformed Path' and 'Object Frame' methods.

In the 3D Offsets method, the computing system 18 transmits the elements of the computed 3D object transformation (from training to runtime relative to a robot coordinate system) to the robot controller. This transformation is subsequently applied to the intended path of operation by the robot controller.

The Transformed Path method in contrast involves the computing system 18 applying the above transformation to the entire robot path, as previously defined at training and stored in an accessible memory location, directly. In this case the entire corrected path is transmitted to the robot controller in a suitable form as points or other geometrical definition.

The Object Frame method is yet another convenient method for sending object pose data to the robot. This method works by initially sending the object 3D pose at the Training View, i.e., the object reference frame, to the robot 14. The robot intended path of operation is then trained relative to this frame with the object in the training position. At runtime, the current object frame is sent to the robot controller which is then used in place of the original reference frame (see FIG. 10). The robot controller uses this mechanism to adjust its path of operation.

In other embodiments, the machine-vision system 10 may omit the robot 14. For example, the machine-vision system 10 may take the form of an inspection system for inspecting objects, without controlling any robotic elements. Alternatively, or additionally, the machine-vision system 10 may take the form of a modeling system, that creates comprehensive or relatively comprehensive CAD models based on sparse model information.

Figure 9:
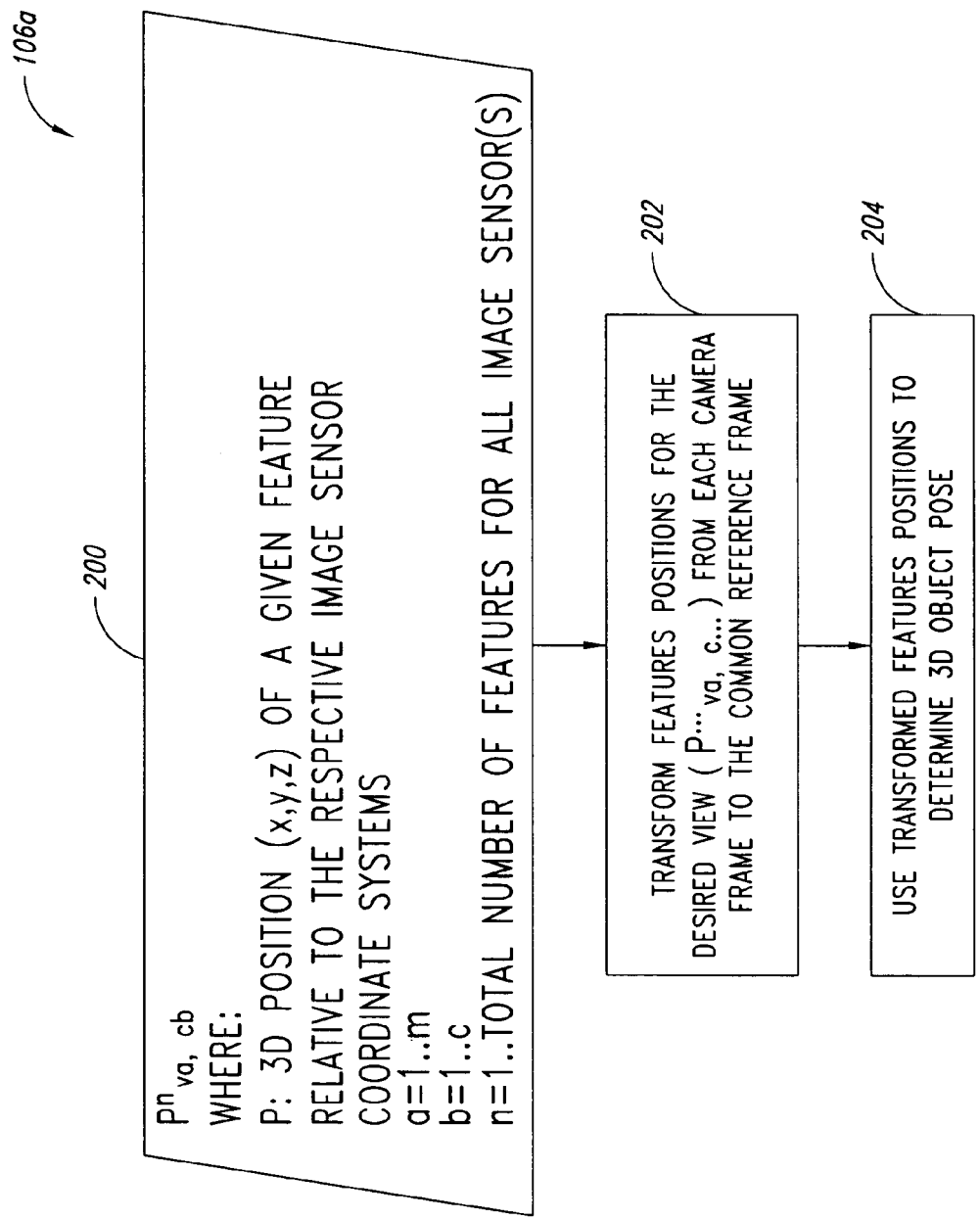
FIG. 9 is a flow diagram showing a method of computing a three-dimensional pose of the target object, according to one illustrated embodiment.

FIG. 9 shows a method 106a of computing a three-dimensional pose of the target object 12, according to a first illustrated embodiment.

At 200, the computing system 18 employs the three-dimensional position information stored at 170 (FIG. 8A), for example retrieving the three-dimensional position information from memory. At 202, the computing system 18 transforms the positions of the features for the desired view from the image sensor reference coordinate frames to a common reference frame. At 204, the computing system 18 uses the transformed feature positions from 202, to determine the 3D object pose.

Figure 10:
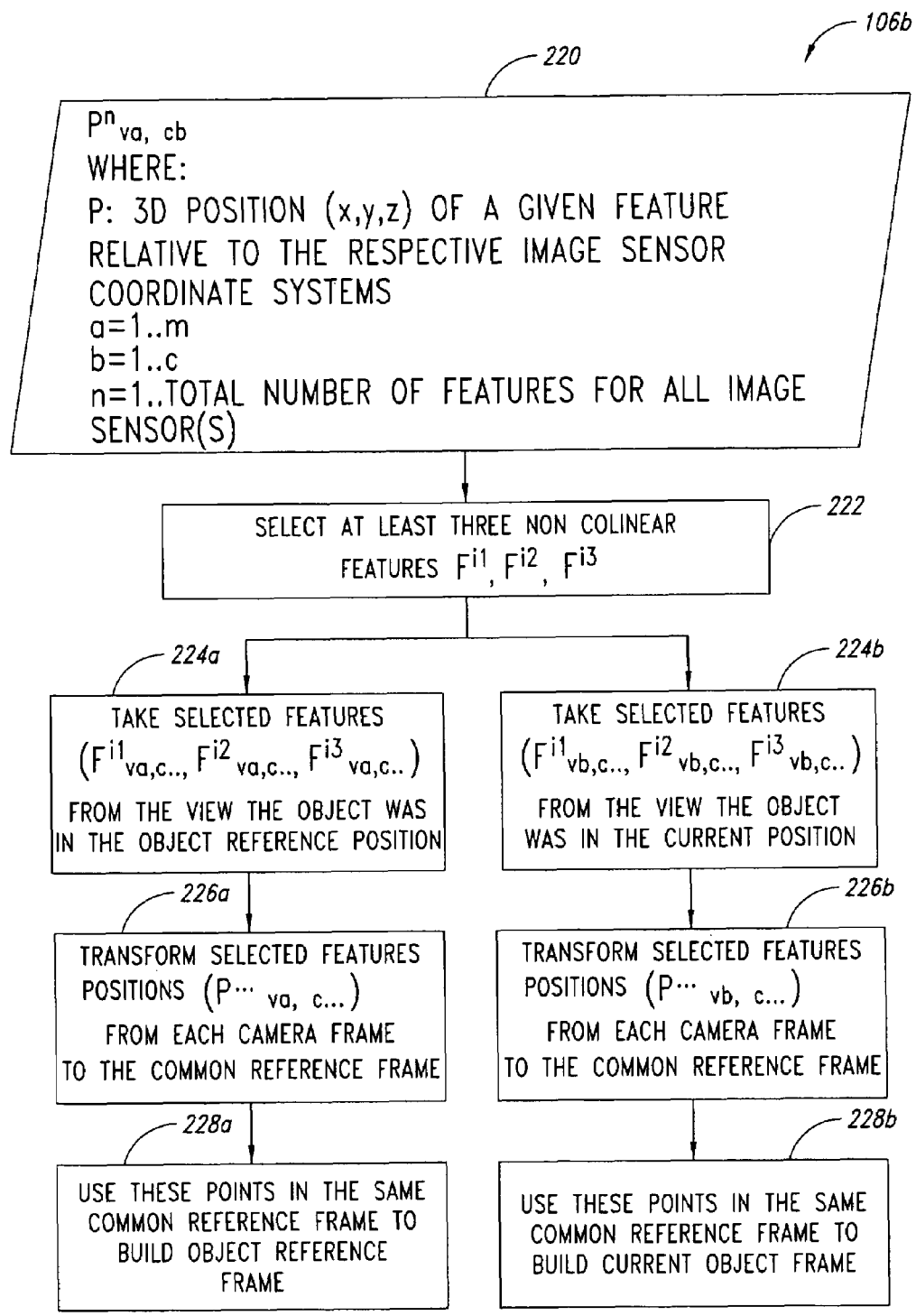
FIG. 10 is a flow diagram showing a method of computing a three-dimensional pose of the target object, according to another illustrated embodiment.

FIG. 10 shows a method 106b of computing a three-dimensional pose of the target object 12, according to another illustrated embodiment. The method 106b may be more suitable for guiding the robot 14 (FIG. 1) in a look and move fashion, than the method 106a (FIG. 9).

At 220, the computing system 18 employs the three-dimensional position information stored at 170 (FIG. 8A), for example retrieving the three-dimensional position information from memory. At 222, the computing system 18 selects at least three non-colinear features 42a-42i.

At 224a, the computing system 18 takes selected features from the view in which the object 12 was in an object reference position. At 224b, the computing system 18 takes selected features from the view in which the target object 12 was in a current object position.

At 226a 226b, the computing system 18 transforms the positions of the selected features from each image sensor coordinate system reference frame to a common coordinate system reference frame.

At 228a and 228b, the computing system 18 uses the transformed positions to build an object reference frame, and a current object frame, respectively.

Figure 11:
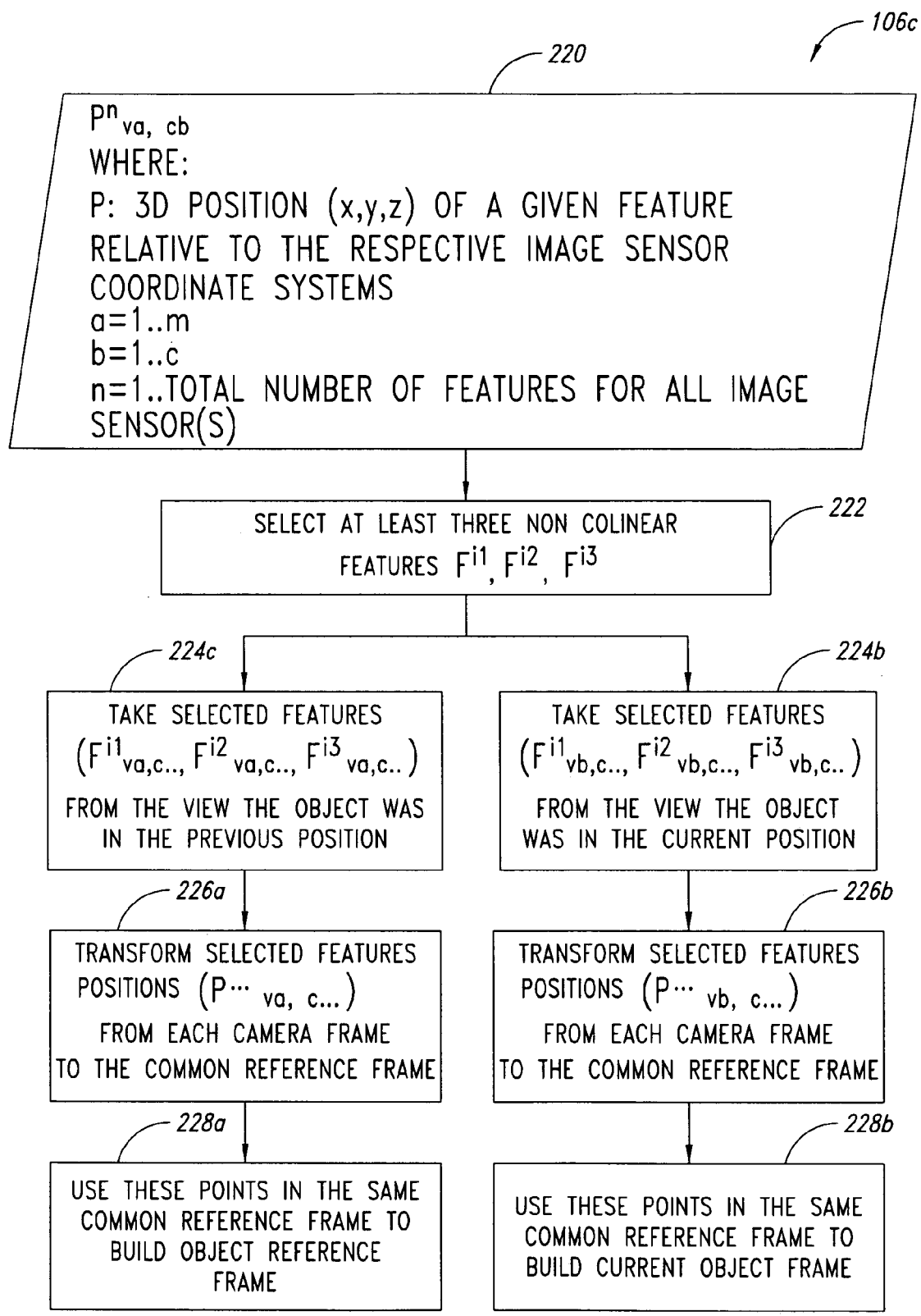
FIG. 11 is a flow diagram showing a method of computing a three-dimensional pose of the target object, according to still another illustrated embodiment.

FIG. 11 shows a method 106c of computing a three-dimensional pose of the target object 12, according to yet another illustrated embodiment. The method 106c may be particular useful for tracking a moving object, for example in a real or near real time environment. Many of the acts of the method 106c are similar or identical to the acts of the method 106b (FIG. 10). Consequently, the same reference numbers are used for similar or identical acts, and only significant differences in operation are discussed below.

In contrast to the method 106b, the method 106c takes selected features from a view of the object in a previous position, at 224c. This may allow real time updates.

A brief description of the underlying algorithms, including the relevant equations may be useful in understanding and/or implementing the machine-vision system 10 and method.

The machine-vision system 10 and method exploit the constancy or invariance of different physical relationships to set up a system of equations, which may be solved to determine the pose of a target object relative to a reference coordinate system, for example via a general nonlinear minimization algorithm. The constancy or invariance derives from the assumption that the object, or at least a portion thereof, is rigid. The physical relationships generally exist between various features on the target object. The machine-vision system 10 and method may employ other physical relationships as well, such as those between various image sensors and/or between features and image sensors.

In particular, the system of equations may be set up using the constancy of distances, angles and/or enclosed volumes between features 42a-42i. However, other additional equations can be set up by exploiting other constant or invariant relationships between features 42a-42i. As example, Feature Coordinates:
image coordinates (extracted from image): xi, yi
sensor coordinates (computed): xs, ys, f (focal length) (feature coordinates in the sensor plane)
camera space coordinates (unknowns): xc, yc, zc
Pinhole camera model relationships:

$$x_c = z_c \cdot \frac{x_s}{f}.$$ Equation 1

$$y_c = z_c \cdot \frac{y_s}{f}$$ Equation 2

For example, the constancy of distances between features in different views may be exploited. Consider two features f1 and f2 that appear in two views v1 and v2. Assuming a rigid object, the distance between f1 and f2 should remain the same from v1 to v2. This equation can be written as:

$$({}^{f1}x_c^{v1} - {}^{f2}x_c^{v1})^2 + ({}^{f1}y_c^{v1} - {}^{f2}y_c^{v1})^2 + ({}^{f1}z_c^{v1} - {}^{f2}z_c^{v1})^2 = ({}^{f1}x_c^{v2} - {}^{f2}x_c^{v2})^2 + ({}^{f1}y_c^{v2} - {}^{f2}y_c^{v2})^2 + ({}^{f1}z_c^{v2} - {}^{f2}z_c^{v2})^2$$ Equation 3

Using equations 1 and 2, equation 3 becomes:

$$({}^{f1}x_s^{v1}{}^{f1}z_c^{v1} - {}^{f2}x_s^{v1}{}^{f2}z_c^{v1})^2 + ({}^{f1}y_s^{v1}{}^{f1}z_c^{v1} - {}^{f2}y_s^{v1}{}^{f2}z_c^{v1})^2 + f^2 \cdot ({}^{f1}z_c^{v1} - {}^{f2}z_c^{v1})^2 = ({}^{f1}x_s^{v2}{}^{f1}z_c^{v2} - {}^{f2}x_s^{v2}{}^{f2}z_c^{v2})^2 + ({}^{f1}y_s^{v2}{}^{f1}z_c^{v2} - {}^{f2}y_s^{v2}{}^{f2}z_c^{v2})^2 + f^2 \cdot ({}^{f1}z_c^{v2} - {}^{f2}z_c^{v2})^2$$ (3) Equation 4

Each pair of features generates $t_m = m \cdot (m-1)/2$ equations for m Views. There are $t_{nf} = nf \cdot (nf-1)/2$, possible pairs for a total of nf features. So the nonlinear system contains $t_{equations} = t_{nf} \cdot t_m$ equation and $t_{unknowns} = nf \cdot m$ unknowns.

For each known distance (d), the corresponding equation for each view is:

$$({}^{f1}x_s^{v1}{}^{f1}z_c^{v1} - {}^{f2}x_s^{v1}{}^{f2}z_c^{v1})^2 + ({}^{f1}y_s^{v1}{}^{f1}z_c^{v1} - {}^{f2}y_s^{v1}{}^{f2}z_c^{v1})^2 + f^2 \cdot ({}^{f1}z_c^{v1} - {}^{f2}z_c^{v1})^2 = d$$ Equation 5

So the total number of equations for a number of known distances (kd) is:

$$t_{equations} = t_{nf} \cdot t_m + kd \cdot m \cdot (m-3)/2$$ Equation 6

For each known ray and corresponding z coordinate (zc) of the feature relative to the imager coordinate system, the number of unknowns decreases by 1.

Likewise, the machine-vision system 10 and method may additionally, or alternatively, exploit the constancy of angles that are formed between features in different views. For example, consider three features f1, f2 and f3 extracted from two views v1 and v2. The angle between the vectors generated by f1, f2 (A) and f2, f3 (B) should remain the same from v1 to v2. This equation can be written as:

$$\cos(\alpha^{v1}) = \cos(\alpha^{v2})$$ Equation 7

The angle equation in one view is:

$$\cos(\alpha^{vl}) = \frac{A^{vl} \cdot B^{vl}}{|A^{vl}||B^{vl}|}$$ Equation 8

$$A^{vl} = ({}^{f2}x_s^{vl} \cdot {}^{f2}z_c^{vl} - {}^{f1}x_s^{vl} \cdot {}^{f1}z_c^{vl}, {}^{f2}y_s^{vl} \cdot {}^{f2}z_c^{vl} - {}^{f1}y_s^{vl} \cdot {}^{f1}z_c^{vl}, {}^{f2}z_c^{vl} - {}^{f1}z_c^{vl})$$

$$B^{vl} = ({}^{f2}x_s^{vl} \cdot {}^{f2}z_c^{vl} - {}^{f3}x_s^{vl} \cdot {}^{f3}z_c^{vl}, {}^{f2}y_s^{vl} \cdot {}^{f2}z_c^{vl} - {}^{f3}y_s^{vl} \cdot {}^{f3}z_c^{vl}, {}^{f2}z_c^{vl} - {}^{f3}z_c^{vl})$$

$$|A^{vl}| = \sqrt{({}^{f2}z_c^{vl})^2 \cdot [({}^{f2}x_s^{vl})^2 + ({}^{f2}y_s^{vl})^2 + 1] + ({}^{f1}z_c^{vl})^2 \cdot [({}^{f1}x_s^{vl})^2 + ({}^{f1}y_s^{vl})^2 + 1] - 2 \cdot ({}^{f2}x_s^{vl} \cdot {}^{f1}x_s^{vl} + {}^{f2}y_s^{vl} \cdot {}^{f1}y_s^{vl}) \cdot {}^{f2}z_c^{vl} \cdot {}^{f1}z_c^{vl}}$$

$$|B^{vl}| = \sqrt{({}^{f2}z_c^{vl})^2 \cdot [({}^{f2}x_s^{vl})^2 + ({}^{f2}y_s^{vl})^2 + 1] + ({}^{f3}z_c^{vl})^2 \cdot [({}^{f3}x_s^{vl})^2 + ({}^{f3}y_s^{vl})^2 + 1] - 2 \cdot ({}^{f2}x_s^{vl} \cdot {}^{f3}x_s^{vl} + {}^{f2}y_s^{vl} \cdot {}^{f3}y_s^{vl}) \cdot {}^{f2}z_c^{vl} \cdot {}^{f3}z_c^{vl}}$$

Each triplet of features generates $t_m = m \cdot (m-1)/2$ equations. There are $t_{nfa} = nf \cdot (nf-1) \cdot (nf-2)/6$, possible triplets for a total of nf features. So the nonlinear system contains $t_{equations} = t_{nfa} \cdot t_m$ equations and $t_{unknowns} = nf \cdot m$ unknowns.

Further, the machine-vision system 10 and method may additionally, or alternatively exploit the constancy of volumes generated between features in different views. For example, consider four non-coplanar features f1, f2, f3 and f4 extracted from two views v1 and v2. The volume of the tetrahedron generated by f1, f2, f3, f4 should remain the same from v1 to v2. This equation can be written as:

$$\text{vol}(f_{1,2,3,4}^{v1}) = \text{vol}(f_{1,2,3,4}^{v1})$$ Equation 9

The volume equation in one view is:

$$\text{vol}(f_{1,2,3,4}^{vl}) = \frac{A^{vl} \cdot (B^{vl} \times C^{vl})}{6}$$ Equation 10

$$A^{vl} = ({}^{f2}x_s^{vl} \cdot {}^{f2}z_c^{vl} - {}^{f1}x_s^{vl} \cdot {}^{f1}z_c^{vl},$$
$${}^{f2}y_s^{vl} \cdot {}^{f2}z_c^{vl} - {}^{f1}y_s^{vl} \cdot {}^{f1}z_c^{vl}, {}^{f2}z_c^{vl} - {}^{f1}z_c^{vl})$$

$$B^{vl} = ({}^{f2}x_s^{vl} \cdot {}^{f2}z_c^{vl} - {}^{f3}x_s^{vl} \cdot {}^{f3}z_c^{vl},$$
$${}^{f2}y_s^{vl} \cdot {}^{f2}z_c^{vl} - {}^{f3}y_s^{vl} \cdot {}^{f3}z_c^{vl}, {}^{f2}z_c^{vl} - {}^{f3}z_c^{vl})$$

$$C^{vl} = ({}^{f2}x_s^{vl} \cdot {}^{f2}z_c^{vl} - {}^{f4}x_s^{vl} \cdot {}^{f4}z_c^{vl},$$
$${}^{f2}y_s^{vl} \cdot {}^{f2}z_c^{vl} - {}^{f4}y_s^{vl} \cdot {}^{f4}z_c^{vl}, {}^{f2}z_c^{vl} - {}^{f4}z_c^{vl})$$

Each tetrahedron generates $t_m = m \cdot (m-1)/2$ equations. There are $t_{nfv} = nf \cdot (nf-1) \cdot (nf-2) \cdot (nf-3)/24$, possible tetrahedron for a total of nf features. So the nonlinear system contains $t_{equations} = t_{nfv} \cdot t_m$ equations and $t_{unknowns} = nf \cdot m$ unknowns.

Beyond the cases outlined above, similar equations can be written based on constancy of various other properties and relationships such as constancy of area enclosed between features.

A nonlinear system for calculating the 3D pose of the object is then created using a collection of equations from various cases. To have a solution there should be at least as many equations as unknowns. For instance such a system may contain equations from case a and a combination of equations from b and/or c.

The system of equations contains the 'Zc' coordinates of each feature in each view as unknowns. Zc can alternatively be expressed as other unknowns in which case the system can be solved for these.

Various methods for solving non-linear systems of equations such as Levenberg-Marquardt, Gauss-Newton, etc. can be used to solve for the pose of the object.

An example of use of the machine-vision system 10 with two or more image sensors may be helpful. Consider the transformation from image sensor i to a common reference frame:

$$tr_{ci} = \begin{bmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{bmatrix}$$

The coordinates of a given feature in the common reference frame are given by:

$$x^{rf} = r_{00} \cdot z_c \cdot \frac{x_s}{f} + r_{01} \cdot z_c \cdot \frac{y_s}{f} + r_{02} \cdot z_c + t_x$$

$$y^{rf} = r_{10} \cdot z_c \cdot \frac{x_s}{f} + r_{11} \cdot z_c \cdot \frac{y_s}{f} + r_{12} \cdot z_c + t_y$$

$$z^{rf} = r_{20} \cdot z_c \cdot \frac{x_s}{f} + r_{21} \cdot z_c \cdot \frac{y_s}{f} + r_{22} \cdot z_c + t_z, (5)$$

Equation 11

Equation 4 is valid in the common reference coordinate system. In this case, Equation 4 becomes:

The nonlinear system can be solved for rays and also for the transformations from camera spaces to the reference frame. If the reference frame is not the coordinate system of one of the cameras (in which case the transformation would have been the identity transformation) then at least one transformation (one camera coordinate system to the reference frame) should be known.

Each pair of features generates $t_m = m \cdot (m-1)/2$ equations.

There are $t_{nf} = nf \cdot (nf-1)/2$, possible pairs for a total of nf features.

The nonlinear system contains $t_{equations} = t_{nf} \cdot t_m$ equation and $t_{unknowns} = t_{nf} \cdot m$ unknowns if the cameras to reference frame transformation are known. Otherwise the number of unknowns is:

The nonlinear system contains $t_{equations} = t_{nf} \cdot t_m$ equation and $t_{unknowns} = t_{nf} \cdot m$ unknowns if the cameras to reference frame transformation are known. Otherwise the number of unknowns is:

An equivalent approach as described above in the case of one image sensor for the angles or volumes can be extended for the multi-camera case.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to machine-vision systems for inspection, modeling and other applications, not necessarily the exemplary robotics machine-vision system generally described above. For example, while examples are illustrated employing distances between features as the invariant physical relationship or parameter, the teaching herein are generally suitable for use with other invariant physical relationships such as angles, areas, volumes, etc.

For instance, the foregoing detailed description has set forth various embodiments of the devices and/or processes via the use of block diagrams, schematics, and examples. Insofar as such block diagrams, schematics, and examples $$\left( r_{00}^{c1} \cdot {}^{f1}z_c^{v1,c1} \cdot \frac{{}^{f1}x_s^{v1}}{f^{c1}} + r_{01}^{c1} \cdot {}^{f1}z_c^{v1,c1} \cdot \frac{{}^{f1}y_s^{v1}}{f^{c1}} + r_{02}^{c1} \cdot {}^{f1}z_c^{v1,c1} + t_x^{c1} - r_{00}^{c2} \cdot {}^{f2}z_c^{v1,c2} \cdot \frac{{}^{f2}x_s^{v1}}{f^{c2}} + r_{01}^{c2} \cdot {}^{f2}z_c^{v1,c2} \cdot \frac{{}^{f2}y_s^{v1}}{f^{c2}} + r_{02}^{c2} \cdot {}^{f2}z_c^{v1,c2} + t_x^{c2} \right)^2 +$$

Equation 12

$$\left( r_{10}^{c1} \cdot {}^{f1}z_c^{v1,c1} \cdot \frac{{}^{f1}x_s^{v1}}{f^{c1}} + r_{11}^{c1} \cdot {}^{f1}z_c^{v1,c1} \cdot \frac{{}^{f1}y_s^{v1}}{f^{c1}} + r_{12}^{c1} \cdot {}^{f1}z_c^{v1,c1} + t_y^{c1} - r_{10}^{c2} \cdot {}^{f2}z_c^{v1,c2} \cdot \frac{{}^{f2}x_s^{v1}}{f^{c2}} + r_{11}^{c2} \cdot {}^{f2}z_c^{v1,c2} \cdot \frac{{}^{f2}y_s^{v1}}{f^{c2}} + r_{12}^{c2} \cdot {}^{f2}z_c^{v1,c2} + t_y^{c2} \right)^2 +$$

$$\left( r_{20}^{c1} \cdot {}^{f1}z_c^{v1,c1} \cdot \frac{{}^{f1}x_s^{v1}}{f^{c1}} + r_{21}^{c1} \cdot {}^{f1}z_c^{v1,c1} \cdot \frac{{}^{f1}y_s^{v1}}{f^{c1}} + r_{22}^{c1} \cdot {}^{f1}z_c^{v1,c1} + t_z^{c1} - r_{20}^{c2} \cdot {}^{f2}z_c^{v1,c2} \cdot \frac{{}^{f2}x_s^{v1}}{f^{c2}} + r_{21}^{c2} \cdot {}^{f2}z_c^{v1,c2} \cdot \frac{{}^{f2}y_s^{v1}}{f^{c2}} + r_{22}^{c2} \cdot {}^{f2}z_c^{v1,c2} + t_z^{c2} \right)^2 =$$

$$\left( r_{00}^{c1} \cdot {}^{f1}z_c^{v2,c1} \cdot \frac{{}^{f1}x_s^{v2}}{f^{c1}} + r_{01}^{c1} \cdot {}^{f1}z_c^{v2,c1} \cdot \frac{{}^{f1}y_s^{v2}}{f^{c1}} + r_{02}^{c1} \cdot {}^{f1}z_c^{v2,c1} + t_x^{c1} - r_{00}^{c2} \cdot {}^{f2}z_c^{v2,c2} \cdot \frac{{}^{f2}x_s^{v2}}{f^{c2}} + r_{01}^{c2} \cdot {}^{f2}z_c^{v2,c2} \cdot \frac{{}^{f2}y_s^{v2}}{f^{c2}} + r_{02}^{c2} \cdot {}^{f2}z_c^{v2,c2} + t_x^{c2} \right)^2 +$$

$$\left( r_{10}^{c1} \cdot {}^{f1}z_c^{v2,c1} \cdot \frac{{}^{f1}x_s^{v2}}{f^{c1}} + r_{11}^{c1} \cdot {}^{f1}z_c^{v2,c1} \cdot \frac{{}^{f1}y_s^{v2}}{f^{c1}} + r_{12}^{c1} \cdot {}^{f1}z_c^{v2,c1} + t_y^{c1} - r_{10}^{c2} \cdot {}^{f2}z_c^{v2,c2} \cdot \frac{{}^{f2}x_s^{v2}}{f^{c2}} + r_{11}^{c2} \cdot {}^{f2}z_c^{v2,c2} \cdot \frac{{}^{f2}y_s^{v2}}{f^{c2}} + r_{12}^{c2} \cdot {}^{f2}z_c^{v2,c2} + t_y^{c2} \right)^2 +$$

$$\left( r_{20}^{c1} \cdot {}^{f1}z_c^{v2,c1} \cdot \frac{{}^{f1}x_s^{v2}}{f^{c1}} + r_{21}^{c1} \cdot {}^{f1}z_c^{v2,c1} \cdot \frac{{}^{f1}y_s^{v2}}{f^{c1}} + r_{22}^{c1} \cdot {}^{f1}z_c^{v2,c1} + t_z^{c1} - r_{20}^{c2} \cdot {}^{f2}z_c^{v2,c2} \cdot \frac{{}^{f2}x_s^{v2}}{f^{c2}} + r_{21}^{c2} \cdot {}^{f2}z_c^{v2,c2} \cdot \frac{{}^{f2}y_s^{v2}}{f^{c2}} + r_{22}^{c2} \cdot {}^{f2}z_c^{v2,c2} + t_z^{c2} \right)^2, (6)$$

contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing medium used to actually carry out the distribution. Examples of signal bearing medium include, but are not limited to, the following: recordable type medium such as floppy disks, hard disk drives, CD ROMs, digital tape, and computer memory; and transmission type medium such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Pat. No. 6,816,755 issued on Nov. 9, 2004, pending U.S. Nonprovisional application Ser. No. 10/634,874; and U.S. provisional application Ser. No. 60/587,488, filed Jul. 14, 2004 are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all machine-vision systems and methods that operated in accordance with the claims. Accordingly, the invention is not limited by the disclosure, but instead its scope is to be determined entirely by the following claims.

We claim:

1. A method useful in machine-vision of objects, the method comprising:
    acquiring a number of images of a first view of a training object from a number of image sensors;
    identifying a number of features of the training object in the acquired at least one image of the first view;
    determining a number of additional views to be obtained based at least in part on the number of image sensors, the number of features identified, the number of features having an invariant physical relationship associated thereto, and a type of the invariant physical relationship associated with the features, sufficient to provide a system of equations and unknowns where the number of unknowns is not greater than the number of equations;
    acquiring at least one image of each of the number of additional views of the training object by the at least one camera; and
    identifying at least some of the number of features of the training object in the acquired at least one image of the number of additional views of the training object
    employing at least one of a consistency of physical relationships between some of the identified features to set up the system of equations; and
    automatically computationally solving the system of equations.

2. The method of claim 1 wherein employing at least one of a consistency of physical relationships between some of the identified features to set up the system of equations comprises employing at least one invariant distance between at least two of the features.

3. The method of claim 1 wherein employing at least one of a consistency of physical relationships between some of the identified features to set up the system of equations comprises employing at least one invariant area enclosed between or by at least one of the features.

4. The method of claim 1 wherein employing at least one of a consistency of physical relationships between some of the identified features to set up the system of equations comprises employing at least one invariant volume enclosed between or by at least one of the features.

5. The method of claim 1, wherein
    determining a number of additional views to be obtained includes computationally solving the equation $m \geq (f^2 - f - 2k - 2r + 6(c-ck))/(f^2 - 3f) - 1$, where m is the number of views, f the number of features, k the number of known distances between pairs of the features, r is the number of rays with a known distance between a feature and an image sensor, c is the number of image sensors and ck is the number of known transformation between an imager sensor reference frame and a common reference frame.

6. The method of claim 1 wherein automatically computationally solving the system of equations includes automatically computationally solving the system of equations to determine a three-dimensional pose estimation.

7. A machine-vision system, comprising:
    at least one image sensor operable to acquire images of a training object and of target objects;
    processor-readable medium storing instructions for facilitating machine-vision for objects having invariant physical relationships between a number of features on the objects, by:
        acquiring a number of images of a first view of a training object from a number of image sensors;
        identifying a number of features of the training object in the acquired at least one image of the first view;
        determining a number of additional views to be obtained based at least in part on the number of image sensors, the number of features identified, the number of features having an invariant physical relationship associated thereto, and a type of the invariant physical relationship associated with the features, sufficient to provide a system of equations and unknowns where the number of unknowns is not greater than the number of equations;

employing at least one of a consistency of physical relationships between some of the identified features to set up the system of equations; and automatically computationally solving the system of equations; and a processor coupled to receive acquired images from the at least one image sensor and operable to execute the instructions stored in the processor-readable medium.

8. The machine-vision system of claim 7 wherein the instructions cause the processor to employ at least one of a consistency of physical relationships between some of the identified features to set up the system of equations by employing at least one invariant distance between at least two of the features.

9. The machine-vision system of claim 7 wherein the instructions cause the processor to employ at least one of a consistency of physical relationships between some of the identified features to set up the system of equations by employing at least one invariant area enclosed between or by at least one of the features.

10. The machine-vision system of claim 7 wherein the instructions cause the processor to employ at least one of a consistency of physical relationships between some of the identified features to set up the system of equations by employing at least one invariant volume enclosed between or by at least one of the features.

11. The machine-vision system of claim 7 wherein determining a number of additional views to be obtained includes computationally solving the equation $m \geq (f^2-f-2k-2r+6(c-ck))/(f^2-3f)-1$, where m is the number of views, f the number of features, k the number of known distances between pairs of the features, r is the number of rays with a known distance between a feature and an image sensor, c is the number of image sensors and ck is the number of known transformation between an imager sensor reference frame and a common reference frame.

12. The machine-vision system of claim 7 wherein automatically computationally solving the system of equations includes automatically computationally solving the system of equations to determine a three-dimensional pose estimation.

13. A processor readable medium storing instructions for causing a processor to facilitate machine-vision for objects having invariant physical relationships between a number of features on the objects, by:

acquiring a number of images of a first view of a training object from a number of cameras;

identifying a number of features of the training object in the acquired at least one image of the first view;

determining a number of additional views to be obtained based at least in part on the number of image sensors, the number of features identified, the number of features having an invariant physical relationship associated thereto, and a type of the invariant physical relationship associated with the features, sufficient to provide a system of equations and unknowns where the number of unknowns is not greater than the number of equations;

employing at least one of a consistency of physical relationships between some of the identified features to set up the system of equations; and automatically computationally solving the system of equations.

14. The processor readable medium of claim 13 wherein the instructions cause the processor to employ at least one of a consistency of physical relationships between some of the identified features to set up the system of equations by employing at least one invariant distance between at least two of the features.

15. The processor readable medium of claim 13 wherein the instructions cause the processor to employ at least one of a consistency of physical relationships between some of the identified features to set up the system of equations by employing at least one invariant area enclosed between or by at least one of the features.

16. The processor readable medium of claim 13 wherein the instructions cause the processor to employ at least one of a consistency of physical relationships between some of the identified features to set up the system of equations by employing at least one invariant volume enclosed between or by at least one of the features.

17. The processor readable medium of claim 13 wherein determining a number of additional views to be obtained includes computationally solving the equation $m \geq (f^2-f-2k-2r+6(c-ck))/(f^2-3f)-1$ where m is the number of views, f the number of features, k the number of known distances between pairs of the features, r is the number of rays with a known distance between a feature and an image sensor, c is the number of image sensors and ck is the number of known transformation between an imager sensor reference frame and a common reference frame.

18. The processor readable medium of claim 13 wherein automatically computationally solving the system of equations includes automatically computationally solving the system of equations to determine a three-dimensional pose estimation.

19. A method useful in machine-vision of objects, the method comprising:

acquiring a number of images of a first view of a training object from a number of cameras;

identifying a number of features of the training object in the acquired at least one image of the first view;

associating parameters to less than all of the identified features which parameters define an invariant physical relationship between either the feature and at least one other feature, the feature and the at least one camera, or between the at least one camera and at least another camera where an invariant physical relationship between each one of the features and at least one other feature is not known when associating the parameters before a runtime;

determining a number of additional views to be obtained based at least in part on the number of cameras, the number of features identified, and the number of features having parameters associated thereto, sufficient to provide a system of equations and unknowns where the number of unknowns is not greater than the number of equations; and acquiring at least one image of each of the number of additional views of the training object by the at least one camera;

identifying at least some of the number of features of the training object in the acquired at least one image of the number of additional views of the training object.

20. The method of claim 19 wherein determining a number of additional views to be obtained comprises computationally solving the equation $m \geq (f^2-f-2k-2r+6(c-ck))/(f^2-3f)-1$, where m is the number of views, f the number of features, k the number of known distances between pairs of the features, r is the number of rays with a known distance between a feature and an image sensor, c is the number of image sensors and ck is the number of known transformation between an imager sensor reference frame and a common reference frame.

21. The method of claim 19, further comprising:
simultaneously solving the system of equations to determine three-dimensional poses for at least some of the features in respective camera coordinate reference frames.

22. The method of claim 21, further comprising:
acquiring at least one image of a view of a target object by the at least one image sensor during the runtime;
identifying at least some of the features in the acquired at least one image of the view of the target object that were previously identified in the at least one image of the view of the training object; and
determining a three-dimensional object pose based at least in part on the determined three-dimensional poses for at least some of the features in respective camera coordinate reference frames.

23. A method useful in machine-vision for objects having invariant physical relationships between a number of features on the objects, the method comprising:
in a pre-runtime environment:
acquiring at least one image of a first view of a training object by at least one image sensor;
identifying a number of features of the training object in the acquired at least one image of the first view; and
associating a number of parameters to less than all of the identified features which define an invariant physical relationship between the either the feature and at least one other feature or between the feature and the at least one image sensor;
determining a number of additional views to be obtained based at least in part on the number of image sensors acquiring at least one image, the number of features of the training object identified, the number of features having parameters associated therewith, and a type of invariant physical relationship associated with each of the parameter;
acquiring at least one image of a second view of the training object by the at least one image sensor; and
identifying at least some of the number of features of the training object in the acquired at least one image of the second view; and
in at least one of a pre-run time environment or a runtime environment, computationally determining a local model using the identified features in each of a number of respective image sensor coordinate frames.

24. The method of claim 23 wherein determining a number of additional views to be obtained comprises computationally solving the equation $m \geq (f^2-f-2k-2r+6(c-ck))/(f^2-3f)-1$, where m is the number of views, f the number of features, k the number of known distances between pairs of the features, r is the number of rays with a known distance between a feature and an image sensor, c is the number of image sensors and ck is the number of known transformation between an imager sensor reference frame and a common reference frame.

25. The method of claim 23 wherein acquiring at least one image of a first view of a training object by at least one image sensor comprises acquiring the image of the object with a first position and a first orientation with respect to the first image sensor, and wherein acquiring at least one image of a second view of the training object by the at least one image sensor comprises acquiring the image of the object with at least one of a second position or a second orientation with respect to the first image sensor.

26. The method of claim 23 wherein identifying a number of features of the training object in the acquired at least one image of the first view comprises identifying at least one of a number of inherent structural features of the training object or a number of markers added to the training object.

27. The method of claim 23 wherein computationally determining a local model using the identified features in each of a number of respective image sensor coordinate frames comprises determining a pose for each of the identified features in a respective one of the acquired images the respective image sensor coordinate frame.

28. The method of claim 23, further comprising:
pose estimating in a runtime environment, by:
acquiring at least one image of a view of a target object by the at least one image sensor;
identifying at least some of the features in the acquired at least one image of the view of the target object that were previously identified in the at least one image of the view of the training object;
computationally determining a reference pose of each of the local models; and
computationally determining a pose of each of the local models in a common reference coordinate system.

29. The method of claim 28 wherein the pose estimating in the runtime environment is further by computationally determining a transformation between the pose of the target object and the pose of the training object by simultaneously solving a system of a number of equations and a number of unknowns, where the number of equations is greater than or equal to the number of unknowns.

30. The method of claim 23, further comprising:
calibrating the at least one image sensor in the pre-runtime environment.

31. The method of claim 30 wherein calibrating the at least one image sensor comprises obtaining a set of intrinsic parameters for the at least one image sensor.

32. The method of claim 30 wherein calibrating the at least one image sensor comprises determining a pose of the at least one image sensor with reference to a robot coordinate system.

33. A machine-vision system, comprising:
at least one image sensor operable to acquire images of a training object and of target objects;
a processor-readable medium storing instructions for facilitating pose estimation for objects having invariant physical relationships between a number of features on the objects, by:
in a pre-runtime environment:
acquiring at least one image of a first view of a training object by at least one image sensor;
identifying a number of features of the training object in the acquired at least one image of the first view; and
associating a number of parameters to less than all of the identified features which define an invariant physical relationship between the either the feature and at least one other feature or between the feature and the at least one image sensor;
determining a number of additional views to be obtained based at least in part on the number of image sensors acquiring at least one image, the number of features of the training object identified, the number of features having parameters associated therewith, and a type of invariant physical relationship associated with each of the parameter;

acquiring at least one image of a second view of the training object by the at least one image sensor; and identifying at least some of the number of features of the training object in the acquired at least one image of the second view; and in at least one of a pre-run time environment or a runtime environment, computationally determining a local model using the identified features in each of a number of respective image sensor coordinate frames; and a processor coupled to receive acquired images from the at least one image sensor and operable to execute the instructions stored in the processor-readable medium.

34. The machine-vision system of claim 33 wherein the at least one image sensor comprises one of a video camera or a digital still camera.

35. A processor readable medium storing instructions for causing a processor to facilitate machine-vision for objects having invariant physical relationships between a number of features on the objects, by:

in a pre-runtime environment:
acquiring at least one image of a first view of a training object by at least one image sensor;

identifying a number of features of the training object in the acquired at least one image of the first view; and associating parameters to less than all of the identified features which define a physical relationship between the either the feature and at least one other feature or between the feature and the at least one image sensor; and determining a number of additional views to be obtained based at least in part on the number of image sensors acquiring at least one image and the number of features of the training object identified;

acquiring at least one image of a second view of the training object by the at least one image sensor; and identifying at least some of the number of features of the training object in the acquired at least one image of the second view; and in at least one of a pre-run time environment or a runtime environment, computationally determining a local model using the identified features in each of a number of respective image sensor coordinate frames.

36. The processor-readable medium of claim 35 wherein the instructions cause the processor to determine the number of additional views to be obtained by computationally solving the equation $m \geq (f^2-f-2k-2r+6(c-ck))/(f^2-3f)-1$, where m is the number of views, f the number of features, k the number of known distances between pairs of the features, r is the number of rays with a known distance between a feature and an image sensor, c is the number of image sensors and ck is the number of known transformation between an imager sensor reference frame and a common reference frame.

37. The processor-readable medium of claim 35 wherein the instructions cause the processor to computationally determine the local model using the identified features in each of the number of respective image sensor coordinate frames by determining a pose for each of the identified features in a respective one of the acquired images the respective image sensor coordinate frame.

38. The processor-readable medium of claim 35 wherein the instructions cause the processor to facilitate machine-vision, further by:

pose estimating in a runtime environment, by:
acquiring at least one image of a view of a target object by the at least one image sensor;

identifying at least some of the features in the acquired at least one image of the view of the target object that were previously identified in the at least one image of the view of the training object;

computationally determining a reference pose of each of the local models;

computationally determining a pose of each of the local models in a common reference coordinate system; and computationally determining a transformation between the pose of the target object and the pose of the training object.

39. The processor-readable medium of claim 38 wherein the instructions cause the processor to facilitate pose estimation, further by:

calibrating the at least one image sensor in the pre-runtime environment.

* * * * *